(12) United States Patent
Fushimi et al.

(10) Patent No.: US 11,426,763 B2
(45) Date of Patent: Aug. 30, 2022

(54) LAMINATE AND METHOD FOR PRODUCING LAMINATE

(71) Applicant: OJI HOLDINGS CORPORATION, Tokyo (JP)

(72) Inventors: Hayato Fushimi, Chiba (JP); Hirokazu Sunagawa, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 873 days.

(21) Appl. No.: 16/071,267

(22) PCT Filed: Jan. 13, 2017

(86) PCT No.: PCT/JP2017/001032
§ 371 (c)(1),
(2) Date: Jul. 19, 2018

(87) PCT Pub. No.: WO2017/126432
PCT Pub. Date: Jul. 27, 2017

(65) Prior Publication Data
US 2021/0207326 A1  Jul. 8, 2021

(30) Foreign Application Priority Data

Jan. 20, 2016  (JP) .............................. JP2016-008853
Mar. 29, 2016  (JP) .............................. JP2016-066001

(51) Int. Cl.
| D21F 11/04 | (2006.01) |
| B05D 7/24 | (2006.01) |
| C08J 7/043 | (2020.01) |
| C08J 7/056 | (2020.01) |
| D21H 11/18 | (2006.01) |
| D21H 19/16 | (2006.01) |
| D21H 19/20 | (2006.01) |
| D21H 19/24 | (2006.01) |

(52) U.S. Cl.
CPC ................ *B05D 7/24* (2013.01); *C08J 7/043* (2020.01); *C08J 7/056* (2020.01); *D21F 11/04* (2013.01); *D21H 11/18* (2013.01); *D21H 19/16* (2013.01); *D21H 19/20* (2013.01); *D21H 19/24* (2013.01)

(58) Field of Classification Search
CPC ............. B32B 1/00–43/00; B05D 7/24; D21B 1/00–1/38; D21C 1/00–11/14; D21F 1/00–13/12; D21G 1/00–9/00; D21H 11/00–27/42; D21J 1/00–7/00
USPC ....................................................... 162/103
See application file for complete search history.

(56) References Cited

U.S. PATENT DOCUMENTS

2017/0043565 A1\* 2/2017 Fushimi ................ B32B 15/085
2018/0264788 A1\* 9/2018 Sunagawa ............... B32B 27/02

FOREIGN PATENT DOCUMENTS

| CN | 101489783 A | 7/2009 |
| CN | 101663161 A | 3/2010 |
| EP | 2 644 371 A1 | 10/2013 |
| EP | 3 135 488 A1 | 3/2017 |
| JP | 2001-105537 A | 4/2001 |
| JP | 2003-336189 A | 11/2003 |
| JP | 2010-023275 A | 2/2010 |
| JP | 2011-149124 A | 8/2011 |
| JP | 2014-079938 A | 5/2014 |
| JP | 2014-223737 A | 12/2014 |
| JP | 2015-54953 A | 3/2015 |
| JP | 2015/172119 A | 10/2015 |
| TW | 201542366 A | 11/2015 |
| WO | 2011/118360 A1 | 9/2011 |
| WO | 2012/070441 A1 | 5/2012 |
| WO | 2015/133564 A1 | 9/2015 |
| WO | 2015/163281 A1 | 10/2015 |
| WO | 2015/182438 A1 | 12/2015 |

OTHER PUBLICATIONS

International Preliminary Report on Patentability with the translation of Written Opinion dated Aug. 2, 2018 from the International Bureau in International application No. PCT/JP2017/001032.
International Search Report dated Mar. 28, 2017 from the International Bureau in International application No. PCT/JP2017/001032.
Office Action dated May 25, 2021 from the Japanese Patent Office in Japanese application No. 2017-562543.
Office Action dated Jul. 1, 2019, issued by the Korean Intellectual Property Office in corresponding Korean Application No. 10-2018-7021777.
Extended European Search Report (EESR) dated Jun. 5, 2019, from the European Patent Office in counterpart European Application No. 17741311.9.
"Database WPI", Week 201433, Thomson Scientific, London, GB; AN 2014-H88451, XP002791613 (2 pages total), May 8, 2014.
"Database WPI", Week 201153, Thomson Scientific, London, GB; AN 2011-J81569, XP002791614 (2 pages total), Aug. 4, 2011.
Office Action dated Mar. 12, 2021, from the China National Intellectual Property Administration in Chinese application No. 201780007502.9.
Notice of Final Rejection dated Mar. 15, 2021, from the Korean Intellectual Property Office in Korean application No. 10-2018-7021777.
Wang Jianqing., "Packaging Materials Science", China Light Industry Press, Jan. 2009, p. 121 (2 pages total).

(Continued)

*Primary Examiner* — Mark Halpern
(74) *Attorney, Agent, or Firm* — Sughrue Mion, PLLC

(57) ABSTRACT

An object of the present invention is to provide a laminate having a fiber layer comprising ultrafine cellulose fibers and a resin layer, wherein the two layers have more excellent adhesion properties. The present invention relates to a laminate having at least one fiber layer comprising cellulose fibers with a fiber width of 1000 nm or less, and at least one resin layer that is contacted with one surface of the fiber layer, wherein the resin layer has an adhesion aid.

19 Claims, 5 Drawing Sheets

(56) References Cited

OTHER PUBLICATIONS

Office Action dated Aug. 25, 2020, issued by the Intellectual Property Office of Taiwan in Taiwan application No. 106101836.
Office Action dated Jul. 30, 2020, issued by the China National Intellectual Property Administration in Chinese application No. 201780007502.9.
Office Action dated Aug. 4, 2020, issued by the Japanese Patent Office in Japanese application No. 2017-562543.
Office Action dated May 14, 2020 in Korean Application No. 10-2018-7021777.
Office Action dated Nov. 18, 2020, issued by the Korean Intellectual Property Office in Korean Application No. 10-2018-7021777.
Office Action dated Dec. 8, 2020, issued by the Taiwanese Intellectual Property Office in Taiwanese Application No. 106101836.
Office Action dated Oct. 23, 2019 from the State Intellectual Property Office of the P.R.C. in counterpart Chinese Application No. 201780007502.9.
Office Action dated Jun. 28, 2021 by China National Intellectual Property Administration in Chinese Application No. 201780007502.9.
Office Action dated Jun. 21, 2021 by European Patent Office in European Application No. 17741311.9.
Office Action dated Oct. 26, 2021 issued from the Korean Patent Office in Korean Application No. 10-2018-7021777.

\* cited by examiner

[Figure 1]
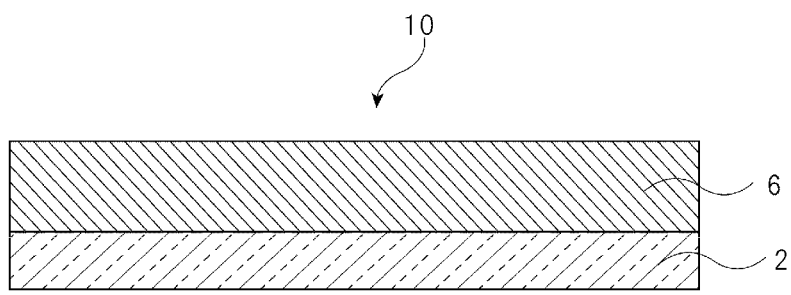
[Figure 2]
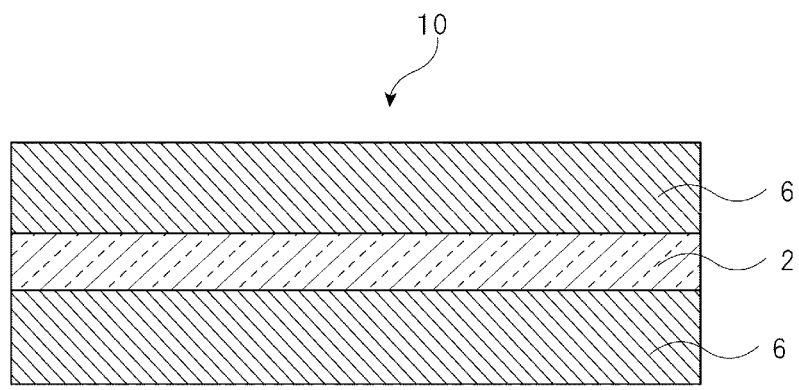

[Figure 3]
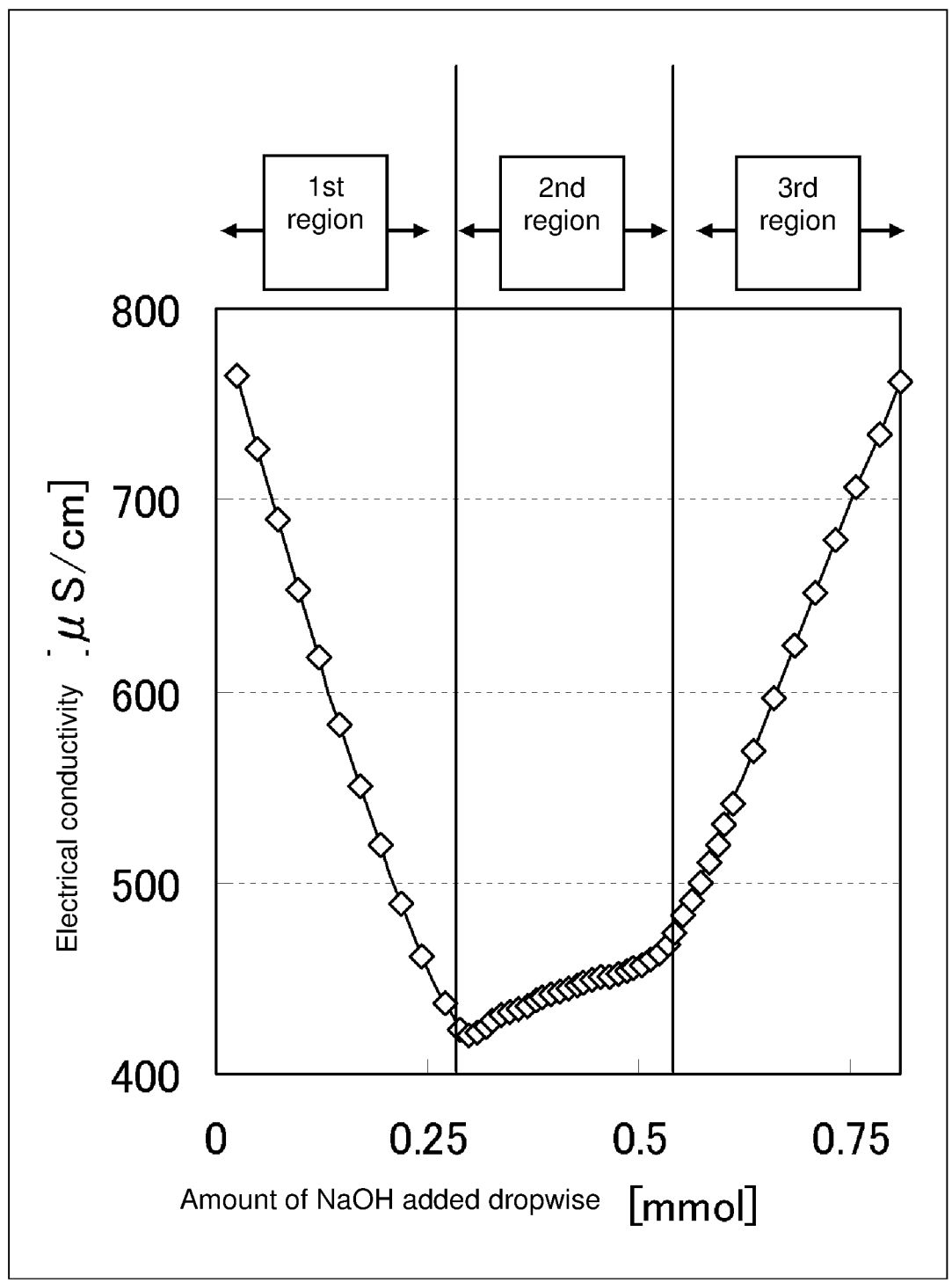

[Figure 4]
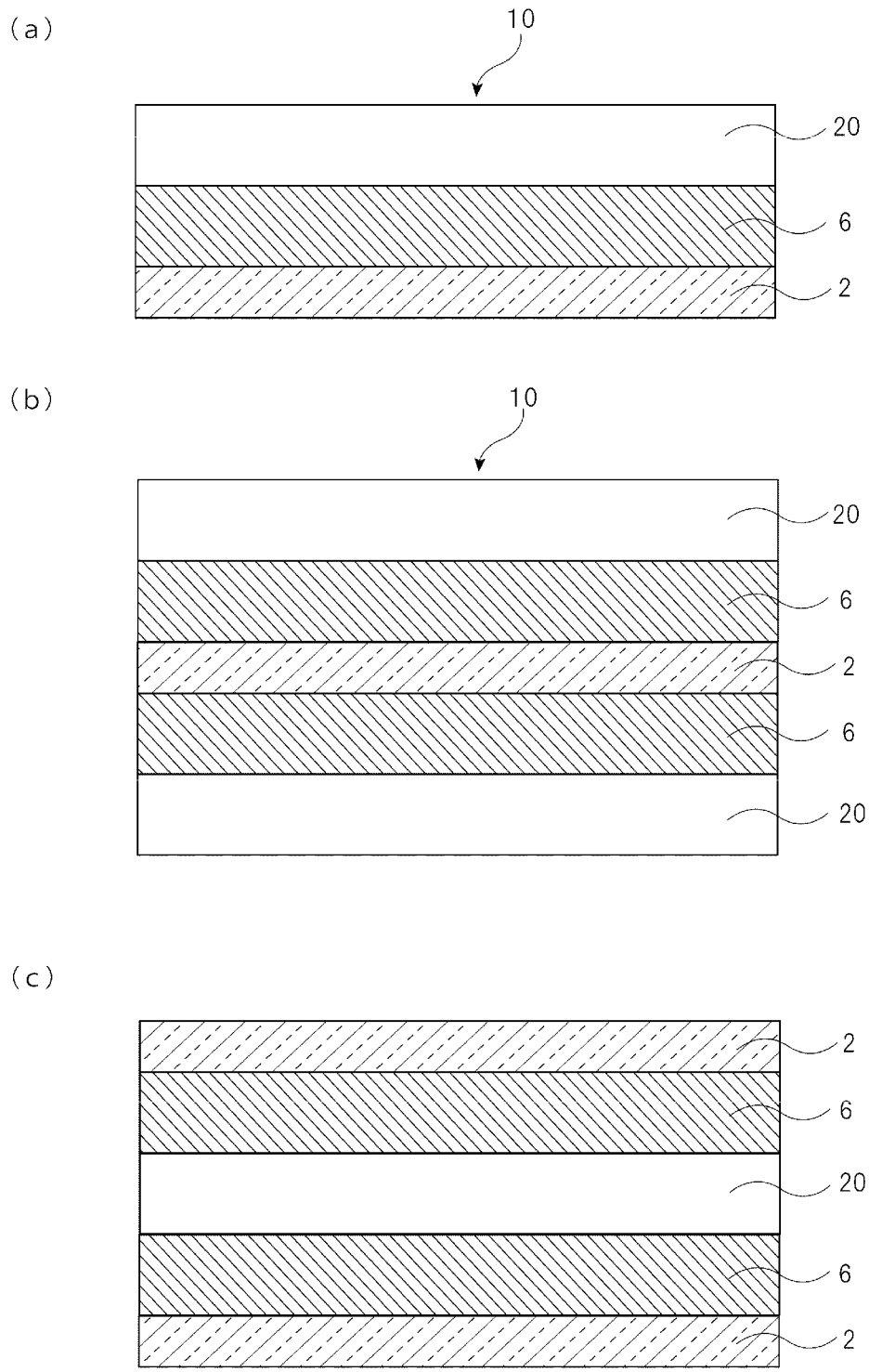

[Figure 5]
(a)
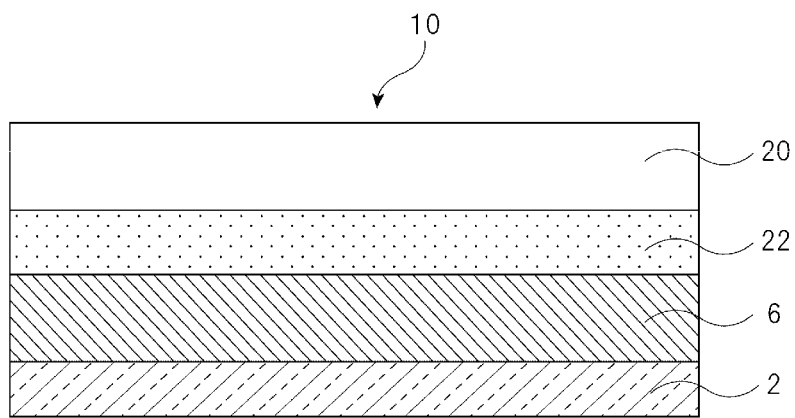
(b)
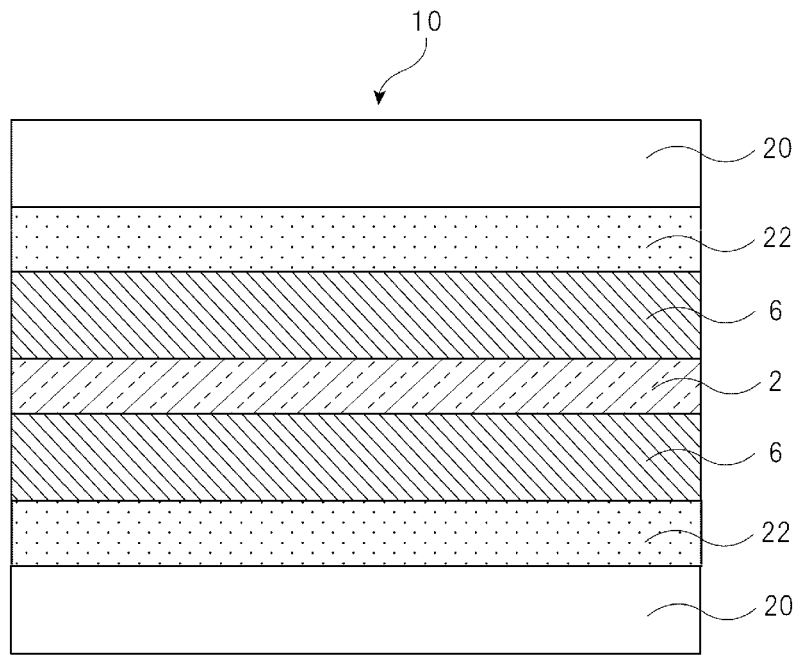

[Figure 6]
(a)
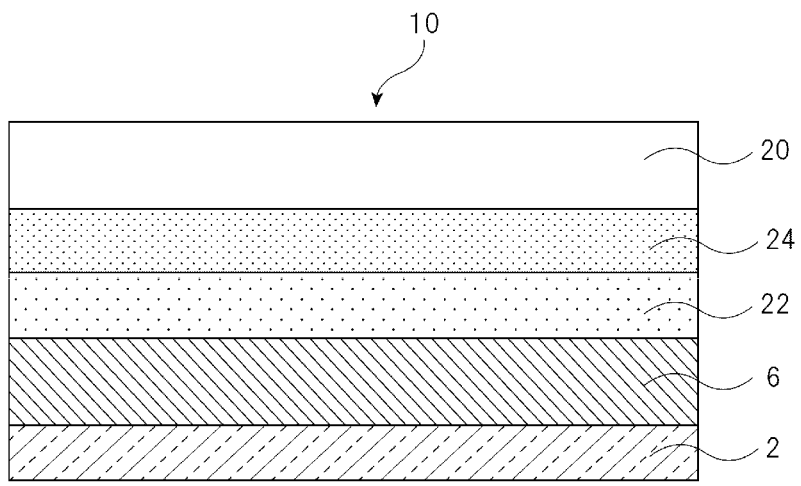
(b)
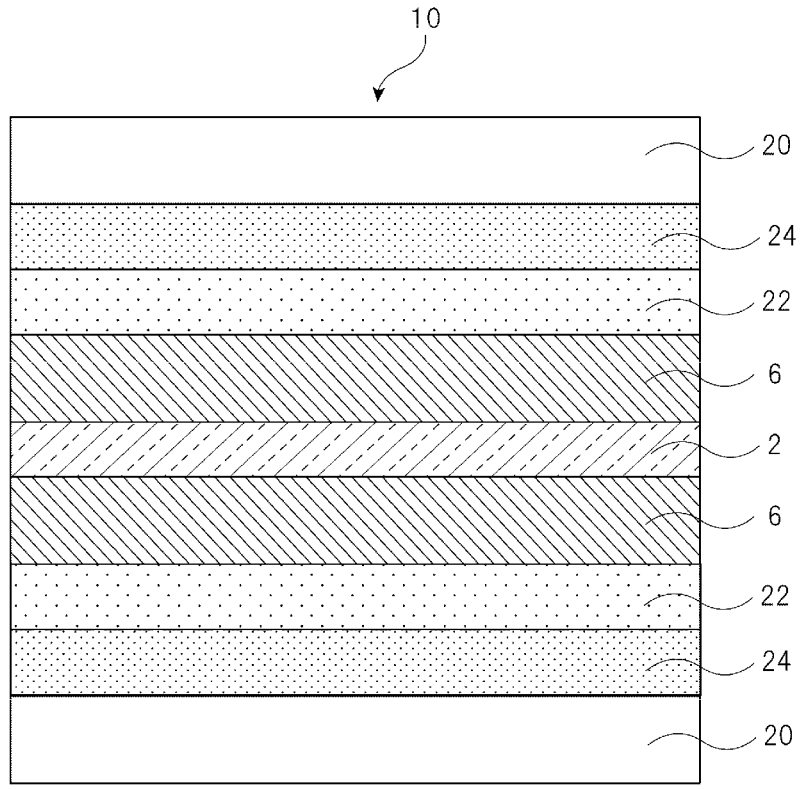

LAMINATE AND METHOD FOR PRODUCING LAMINATE

CROSS REFERENCE TO RELATED APPLICATIONS

This application is a National Stage of International Application No. PCT/JP2017/001032 filed Jan. 13, 2017, claiming priority based on Japanese Patent Application No. 2016-008853 filed Jan. 20, 2016 and Japanese Patent Application No. 2016-066001 filed Mar. 29, 2016.

TECHNICAL FIELD

The present invention relates to a laminate and a method for producing a laminate.

BACKGROUND ART

In recent years, because of enhanced awareness of alternatives to petroleum resources and environmental consciousness, there has been a focus on materials utilizing reproducible natural fibers. Among natural fibers, cellulose fibers having a fiber diameter of 10 μm or more and 50 μm or less, in particular, wood-derived cellulose fibers (pulp) have been widely used mainly as paper products so far.

Ultrafine cellulose fibers, which have a fiber diameter of 1 μm or less, have been known as cellulose fibers. In addition, a sheet composed of such ultrafine cellulose fibers, and a complex comprising an ultrafine cellulose fiber-containing sheet and a resin, have been developed. Since the contacts of fibers are significantly increased in a sheet or a complex that contains ultrafine cellulose fibers, it has been known that tensile strength and the like are significantly improved in such a sheet or a complex. Moreover, it has also been known that since the fiber width becomes shorter than the wavelength of a visible light, the transparency is significantly improved.

When a composite comprising an ultrafine cellulose fiber-containing sheet and a resin layer is formed, in order to enhance adhesion properties between the ultrafine cellulose fiber-containing sheet and the resin layer, addition of additives, etc., into each layer has been studied. For example, in Patent Document 1, addition of a polycarboxylic acid-based polymer into an ultrafine cellulose fiber-containing sheet has been studied. In addition, in Patent Document 2, it has been proposed that a polycarbonate sheet is heat-fused with an ultrafine cellulose fiber-containing sheet to form a laminate. In this document, an ultrafine cellulose fiber-containing sheet, which had been impregnated in advance with a priming liquid, such as an acrylic primer, has been heat-fused with a polycarbonate sheet to form a laminate. Moreover, in Patent Document 3, it has been proposed that a silane coupling agent is mixed into an ultrafine cellulose fiber-containing sheet, so that adhesion properties between a resin layer and the ultrafine cellulose fiber-containing sheet are enhanced.

PRIOR ART DOCUMENTS

Patent Documents

Patent Document 1: JP-A-2014-223737
Patent Document 2: JP-A-2010-023275
Patent Document 3: International Publication WO 2011/118360

SUMMARY OF INVENTION

Object to be Solved by the Invention

However, in conventional laminates, adhesion properties between an ultrafine cellulose fiber-containing sheet (fiber layer) and a resin layer are not sufficient, and thus, a further improvement has been desired in the mode of use thereof in some cases.

Hence, in order to solve the problem of the prior-art technique, the present inventors have conducted studies for the purpose of providing a laminate comprising an ultrafine cellulose fiber-containing sheet (fiber layer) and a resin layer, wherein there are more excellent adhesion properties between the fiber layer and the resin layer.

Means for Solving the Object

As a result of intensive studies in order to solve the aforementioned problem, the present inventors have found that, in a laminate having a fiber layer comprising cellulose fibers with a fiber width of 1000 nm or less and a resin layer that is contacted with one surface of the fiber layer, the resin layer is allowed to comprise an adhesion aid, so that the adhesion properties between the fiber layer and the resin layer can be enhanced.

Specifically, the present invention has the following configurations.

[1] A laminate having at least one fiber layer comprising cellulose fibers with a fiber width of 1000 nm or less, and at least one resin layer that is contacted with one surface of the fiber layer, wherein the resin layer has an adhesion aid.
[2] The laminate according to [1], wherein the resin layer has at least one selected from a polycarbonate resin and an acrylic resin.
[3] The laminate according to [1] or [2], wherein the adhesion aid is at least one selected from an isocyanate compound and an organic silicon compound.
[4] The laminate according to any one of [1] to [3], wherein the adhesion aid is concentrated in a region of the resin layer, which is closer to the fiber layer.
[5] The laminate according to any one of [1] to [4], wherein the adhesion aid is an isocyanate compound, and the content of the isocyanate compound is 10 parts by mass or more and 40 parts by mass or less, based on 100 parts by mass of resin comprised in the resin layer.
[6] The laminate according to any one of [1] to [5], wherein the adhesion aid is an isocyanate compound, and the content of isocyanate groups in the resin layer is 0.5 mmol/g or more and 3.0 mmol/g or less.
[7] The laminate according to any one of [1] to [6], wherein the density of the fiber layer is 1.0 g/cm$^3$ or more.
[8] A method for producing a laminate, comprising
  (a) applying a resin composition comprising an adhesion aid, after forming a fiber layer comprising cellulose fibers with a fiber width of 1000 nm or less, or
  (b) applying an ultrafine cellulose fiber dispersion comprising cellulose fibers with a fiber width of 1000 nm or less, after forming a resin layer comprising an adhesion aid.
[9] The method for producing a laminate according to [8], comprising (a), wherein the adhesion aid is an isocyanate compound.
[10] The method for producing a laminate according to [8], comprising (b), wherein the adhesion aid is an organic silicon compound.

Advantageous Effects of Invention

According to the present invention, there can be obtained a laminate having a fiber layer comprising ultrafine cellulose fibers and a resin layer, wherein the adhesion properties between the fiber layer and the resin layer are enhanced. Since the laminate of the present invention is a laminate that is excellent in terms of adhesion properties, it can be applied to various intended uses.

BRIEF DESCRIPTION OF DRAWINGS

FIG. 1 is a cross-sectional view showing a configuration of the laminate of the present invention.

FIG. 2 is a cross-sectional view showing a configuration of the laminate of the present invention.

FIG. 3 is a graph showing the relationship between the amount of NaOH added dropwise to a fiber raw material and the electrical conductivity.

FIG. 4 includes cross-sectional views each showing a configuration of the laminate of the present invention.

FIG. 5 includes cross-sectional views each showing a configuration of the laminate of the present invention.

FIG. 6 includes cross-sectional views each showing a configuration of the laminate of the present invention.

EMBODIMENT OF CARRYING OUT THE INVENTION

Hereinafter, the present invention will be described in detail. The description for components described below will be based on representative embodiments or specific examples; however, the present invention will not be limited to such embodiments.
(Laminate)

The present invention relates to a laminate having at least one fiber layer comprising cellulose fibers with a fiber width of 1000 nm or less (hereinafter also referred to as "ultrafine cellulose fibers"), and at least one resin layer that is contacted with one surface of the fiber layer. In the laminate of the present invention, the resin layer comprises an adhesion aid.

Since the laminate of the present invention has the above-described configuration, it is excellent in terms of adhesion properties between a fiber layer comprising cellulose fibers with a fiber width of 1000 nm or less and a resin layer.

FIG. 1 is a cross-sectional view showing a configuration of the laminate of the present invention. As shown in FIG. 1, a laminate 10 of the present invention has a fiber layer 2 and a resin layer 6. The fiber layer 2 and the resin layer 6 are laminated on each other, so that they are contacted with each other on either one surface thereof.

The laminate of the present invention may have at least one fiber layer 2 and at least one resin layer 6. Otherwise, the present laminate may have two or more fiber layers 2, or may also have two or more resin layers 6. For example, FIG. 2 illustrates a laminate 10 having two resin layers 6. As shown in FIG. 2, the two resin layers 6 may be established on both surfaces of the fiber layer 2. Moreover, the fiber layer 2 sandwiched between the resin layers 6 may have a multilayer configuration.

The overall thickness of the laminate of the present invention is not particularly limited, but preferably 50 μm or more, more preferably 100 μm or more, and further preferably 200 μm or more. In addition, the overall thickness of the laminate is preferably 20 mm or less. The thickness of the laminate is preferably appropriately adjusted depending on use.

The thickness of the fiber layer of the laminate is preferably 5 μm or more, more preferably 10 μm or more, and further preferably 20 μm or more. The thickness of the fiber layer is also preferably 500 μm or less, more preferably 200 μm or less, and further preferably 100 μm or less. In this context, the thickness of the fiber layer, which constitutes the laminate, is a value measured by cutting out a cross section of the laminate with the ultramicrotome UC-7 (manufactured by JEOL Ltd.) and observing the cross section with an electron microscope or a magnifying glass, or visually. When the laminate comprises a plurality of fiber layers, the total thickness of these fiber layers are preferably within the above-described range.

In addition, the thickness of the resin layer of the laminate is preferably 10 μm or more, more preferably 20 μm or more, further preferably 50 μm or more, even further preferably 100 μm or more, and particularly preferably 200 μm or more. The thickness of the resin layer is also preferably 15000 μm or less, more preferably 5000 μm or less, and further preferably 500 μm or less. In this context, the thickness of the resin layer, which constitutes the laminate, is a value measured by cutting out a cross section of the laminate with the ultramicrotome UC-7 (manufactured by JEOL Ltd.) and observing the cross section with an electron microscope or a magnifying glass, or visually. When the laminate comprises a plurality of resin layers, the total thickness of these resin layers is preferably within the above-described range.

In the laminate of the present invention, the thickness of the resin layer is preferably 30% or more and more preferably 100% or more of the thickness of the fiber layer. In addition, when the laminate has a plurality of at least one of the fiber layers and the resin layers, the ratio of the total thickness of resin layers to the total thickness of fiber layers (the total thickness of resin layers/the total thickness of fiber layers) is preferably 0.5 or more. By making the ratio of the total thickness of resin layers to the total thickness of fiber layers within the above-described range, the mechanical strength of the laminate can be enhanced.

The total light transmittance of the laminate is, for example, preferably 60% or more, more preferably 65% or more, further preferably 70% or more, and particularly preferably 85% or more. By making the total light transmittance of the laminate in the above-described range, it becomes easy to apply the laminate of the present invention to the use for which transparent glass has been conventionally applied. In this context, the total light transmittance is a value measured using a haze meter (manufactured by MURAKAMI COLOR RESEARCH LABORATORY CO., Ltd., HM-150) in accordance with JIS K 7361.

The haze of the laminate is preferably 20% or less, more preferably 15% or less, further preferably 10% or less, and particularly preferably 5% or less. The lower the haze is, the easier it becomes to apply the laminate of the present invention to the use for which transparent glass has been conventionally applied. In this context, the haze is a value measured using a haze meter (manufactured by MURAKAMI COLOR RESEARCH LABORATORY CO., Ltd., HM-150) in accordance with JIS K 7136.

The tensile elastic modulus of the laminate at a temperature of 23° C. and a relative humidity of 50% is preferably 2.5 GPa or more, more preferably 5.0 GPa or more, and further preferably 10 GPa or more. The tensile elastic modulus of the laminate at a temperature of 23° C. and a relative humidity of 50% is also preferably 30 GPa or less, more preferably 25 GPa or less, and further preferably 20 GPa or less. The tensile elastic modulus of the laminate is a value measured in accordance with JIS P8113.
(Resin Layer)

The resin layer is a layer that has a natural resin or a synthetic resin as a main component. In this context, the main component refers to a component comprised in 50% by mass or more, based on the total mass of the resin layer. The content of the resin is preferably 60% by mass or more, more preferably 70% by mass or more, further preferably 80% by mass or more, and particularly preferably 90% by mass or more, based on the total mass of the resin layer. It is to be noted that the content of the resin may be set at 100% by mass, or may also be set at 95% by mass or less.

Examples of natural resins may include rosin-based resins, such as rosin, rosin ester and hydrated rosin ester.

The synthetic resin is preferably at least one selected from, for example, polycarbonate resins, polyethylene terephthalate resins, polyethylene naphthalate resins, polyethylene resins, polypropylene resins, polyimide resins, polystyrene resins and acrylic resins. Among them, the synthetic resin is preferably at least one selected from polycarbonate resins and acrylic resins, and more preferably a polycarbonate resin. It is to be noted that the acrylic resin is preferably at least any one selected from polyacrylonitrile and poly(meth)acrylate.

Examples of the polycarbonate resin, which constitutes the resin layer, include aromatic polycarbonate-based resins and aliphatic polycarbonate-based resins. These specific polycarbonate-based resins are known, and a polycarbonate-based resin described in JP Patent Publication (Kokai) No. 2010-023275 A is included, for example.

In the laminate of the present invention, the resin layer comprises an adhesion aid. Examples of the adhesion aid include compounds comprising at least one selected from an isocyanate group, a carbodiimide group, an epoxy group, an oxazoline group, an amino group and a silanol group, and organic silicon compounds. Among these compounds, the adhesion aid is at least one selected from compounds comprising an isocyanate group (isocyanate compounds) and organic silicon compounds. Examples of the organic silicon compound include silane coupling agent condensates and silane coupling agents.

Examples of the isocyanate compound include polyisocyanate compounds and polyfunctional isocyanates. Specific examples of the polyisocyanate compound include aromatic polyisocyanates containing 6 or more and 20 or less carbon atoms, except for carbon atoms in NCO groups, aliphatic polyisocyanates containing 2 or more and 18 or less carbon atoms, alicyclic polyisocyanates containing 6 or more and 15 or less carbon atoms, aralkyl-type polyisocyanates containing 8 or more and 15 or less carbon atoms, modified products of these polyisocyanates, and mixtures of two or more thereof. Among others, an alicyclic polyisocyanate containing 6 or more and 15 or less carbon atoms, namely, isocyanurate is preferably used.

Specific examples of the alicyclic polyisocyanate include isoboron diisocyanate (IPDI), dicyclohexylmethane-4,4'-diisocyanate (hydrogenated MDI), cyclohexylene diisocyanate, methylcyclohexylene diisocyanate, bis(2-isocyanatoethyl)-4-cyclohexene-1,2-dicarboxylate, 2,5-norbornane diisocyanate, and 2,6-norbornane diisocyanate.

Examples of the organic silicon compound include compounds having a siloxane structure and compounds forming a siloxane structure as a result of condensation. Specific examples of such compounds include silane coupling agents and condensates of silane coupling agents. The silane coupling agent may have or may not have a functional group other than an alkoxysilyl group. Examples of such a functional group other than an alkoxysilyl group include a vinyl group, an epoxy group, a styryl group, a methacryloxy group, an acryloxy group, an amino group, a ureido group, a mercapto group, a sulfide group, and an isocyanate group.

The silane coupling agent used in the present invention is preferably a silane coupling agent containing a methacryloxy group.

Specific examples of the silane coupling agent having a methacryloxy group in a molecule thereof include methacryloxypropylmethyldimethoxysilane, methacryloxypropyltrimethoxysilane, methacryloxypropylmethyldiethoxysilane, methacryloxypropyltriethoxysilane, and 1,3-bis(3-methacryloxypropyl)tetramethyldisiloxane. Among others, at least one selected from methacryloxypropyltrimethoxysilane, methacryloxypropyltriethoxysilane and 1,3-bis(3-methacryloxypropyl)tetramethyldisiloxane is preferably used. The silane coupling agent preferably contains three or more alkoxysilyl groups.

In the silane coupling agent, it is preferable that silanol groups be generated after hydrolysis, and that at least some silanol groups be present even after lamination of a fiber layer. Since such silanol groups are hydrophilic groups, the adhesion properties between the fiber layer and the resin layer can be enhanced by increasing the hydrophilicity of a surface of the resin layer, which is on the fiber layer side.

The adhesion aid may be comprised in the resin layer in a state in which it is uniformly dispersed in the resin layer. In this context, the state in which the adhesion aid is uniformly dispersed in the resin layer means a state in which when the concentrations of the following three regions ((a) to (c)) are measured, a difference of two or more times cannot be obtained between the concentrations of any two regions:
(a) a region corresponding to 10% of the entire thickness of the resin layer from the surface thereof on the fiber layer side;
(b) a region corresponding to 10% of the entire thickness of the resin layer from the surface thereof that is opposite to the surface on the fiber layer side; and
(c) a region corresponding to ±5% (total 10%) of the entire thickness of the resin layer from the center plane thereof in the thickness direction.

Otherwise, the adhesion aid may also be concentrated in a region of the resin layer, which is closer to the fiber layer. For example, when an organic silicon compound is used as such an adhesion aid, the organic silicon compound may be concentrated in a region of the resin layer, which is closer to the fiber layer.

In this context, the state in which the adhesion aid is concentrated in a region of the resin layer, which is closer to the fiber layer, means a state in which when the concentrations of the following two regions ((d) and (e)) are measured, a difference of two or more times can be obtained between the two concentrations:
(d) a region corresponding to 10% of the entire thickness of the resin layer from the surface thereof on the fiber layer side; and
(e) a region corresponding to ±5% (total 10%) of the entire thickness of the resin layer from the center plane thereof in the thickness direction.

Herein, the concentration of the adhesion aid is a value measured using an X-ray photoelectron spectroscopy apparatus or an infrared spectrophotometer, and it is a value that can be obtained by cutting out a cross section of the predetermined region of a laminate with the ultramicrotome UC-7 (manufactured by JEOL Ltd.) and measuring the cross section with this device.

An organic silicon compound-containing layer may be established on the fiber layer-side surface of the resin layer, and such a state is also included in the state in which the organic silicon compound is concentrated in the fiber layer-side surface of the resin layer. The organic silicon compound-containing layer may be a coated layer formed by applying an organic silicon compound-containing coating solution to the resin layer.

Besides, when the organic silicon compound-containing layer is established on the fiber layer-side surface of the resin layer, "the fiber layer-side surface of the resin layer" in the above-described region (d) is replaced with "the exposed surface of the organic silicon compound-containing layer," and "the entire thickness of the resin layer" is replaced with "the total thickness of the resin layer and the organic silicon compound-containing layer."

The content of the adhesion aid is preferably 0.1 part by mass or more, and more preferably 0.5 parts by mass or more, based on 100 parts by mass of resin comprised in the resin layer. On the other hand, the content of the adhesion aid is preferably 40 parts by mass or less, and more preferably 35 parts by mass or less, based on 100 parts by mass of resin comprised in the resin layer.

When the adhesion aid is an isocyanate compound, the content of the isocyanate compound is preferably 10 parts by mass or more, more preferably 15 parts by mass or more, and further preferably 18 parts by mass or more, based on 100 parts by mass of resin comprised in the resin layer. On the other hand, the content of the isocyanate compound is preferably 40 parts by mass or less, more preferably 35 parts by mass or less, and further preferably 30 parts by mass or less, based on 100 parts by mass of resin comprised in the resin layer.

When the adhesion aid is an organic silicon compound, the content of the organic silicon compound is preferably 0.1 part by mass or more, and more preferably 0.5 parts by mass or more, based on 100 parts by mass of resin comprised in the resin layer. On the other hand, the content of the organic silicon compound is preferably 10 parts by mass or less, and more preferably 5 parts by mass or less, based on 100 parts by mass of resin comprised in the resin layer.

By setting the content of the adhesion aid within the above-described range, the adhesion properties between the fiber layer and the resin layer can be more effectively enhanced.

When the adhesion aid is an isocyanate compound, the content of isocyanate groups comprised in the resin layer is preferably 0.5 mmol/g or more, more preferably 0.6 mmol/g or more, further preferably 0.8 mmol/g or more, and particularly preferably 0.9 mmol/g or more. On the other hand, the content of isocyanate groups comprised in the resin layer is preferably 3.0 mmol/g or less, more preferably 2.5 mmol/g or less, further preferably 2.0 mmol/g or less, and particularly preferably 1.5 mmol/g or less.

The fiber layer-side surface of the resin layer may be surface-treated. Examples of the surface treatment method include a corona treatment, a plasma discharge treatment, a UV irradiation treatment, an electron beam irradiation treatment, and a flame treatment. Of these, the surface treatment is preferably at least one selected from a corona treatment and a plasma discharge treatment. It is to be noted that the plasma discharge treatment is preferably a vacuum plasma discharge treatment.

On the fiber layer-side surface of the resin layer, an ultrafine uneven structure may be formed. When the fiber layer-side surface of the resin layer has an ultrafine uneven structure, it is possible to more effectively enhance the adhesion properties between the fiber layer and the resin layer. When the fiber layer-side surface of the resin layer has an ultrafine uneven structure, such a structure is preferably formed by a treatment step such as a blasting treatment, an embossing treatment, an etching treatment, a corona treatment, and a plasma discharge treatment. It is to be noted that the term "ultrafine uneven structure" is used in the present description to mean a structure in which 10 or more recesses exist on a straight line of 1 mm in length drawn at any given area. When the number of recesses is measured, the laminate is immersed in ion exchange water for 24 hours, and the fiber layer is then detached from the resin layer. Thereafter, the fiber layer-side surface of the resin layer is scanned by a stylus-type surface roughness measuring instrument (manufactured by Kosaka Laboratory Ltd., Surfcorder series). When recesses and projections have extremely small pitches of a submicron or nanometer order, the number of recesses and projections can be measured from observed images obtained by a scanning probe microscope (manufactured by Hitachi High-Tech Science Corporation, AFM5000II and AFM5100N).

Optional components other than synthetic resins may be comprised in the resin layer. Examples of such optional components include known components used in the resin film field, such as fillers, pigments, dyes and ultraviolet absorbing agents.

(Fiber Layer)

The fiber layer comprises cellulose fibers with a fiber width of 1000 nm or less. The content of ultrafine cellulose fibers comprised in the fiber layer is preferably 60% by mass or more, more preferably 70% by mass or more, and further preferably 80% by mass or more, based on the total mass of the fiber layer.

The density of the fiber layer is preferably 1.0 g/cm$^3$ or more, more preferably 1.2 g/cm$^3$ or more, and further preferably 1.4 g/cm$^3$ or more. On the other hand, the density of the fiber layer is preferably 1.7 g/cm$^3$ or less, more preferably 1.65 g/cm$^3$ or less, and further preferably 1.6 g/cm$^3$ or less. When the laminate comprises two or more fiber layers, the density of each fiber layer is preferably within the above-described range.

The density of the fiber layer is calculated from the basis weight and thickness thereof in accordance with JIS P8118. The basis weight of the fiber layer can be calculated in accordance with the JIS standard P8124 by cutting the laminate with the ultramicrotome UC-7 (manufactured by JEOL Ltd.), such that only the fiber layer is left. It is to be noted that when the fiber layer comprises optional components other than ultrafine cellulose fibers, the density of the fiber layer is a density including such optional components other than ultrafine cellulose fibers.

In the present invention, the fiber layer may also be characterized by being a nonporous layer. In this context, a nonporous fiber layer means that the density of the entire fiber layer is 1.0 g/cm$^3$ or more. When the density of the entire fiber layer is 1.0 g/cm$^3$ or more, it means that the porosity included in the fiber layer is suppressed to a predetermined value or less, distinguishing the fiber layer from porous sheets or layers.

Moreover, the nonporous fiber layer may be characterized in that the porosity is 15% by volume or less. In this context, the porosity of the fiber layer is simply obtained through Equation (a) below:

$$\text{Porosity (\% by volume)} = \{1 - B/(M \times A \times t)\} \times 100 \quad \text{Equation (a):}$$

wherein A is the area (cm$^2$) of the fiber layer, t is the thickness (cm) of the fiber layer, B is the mass (g) of the fiber layer, and M is the density of cellulose.

<Ultrafine Cellulose Fibers>

Although there is no particular restriction on a cellulose fiber raw material for yielding ultrafine cellulose fibers, pulp is preferably used from the viewpoint of availability and inexpensiveness. Examples of the pulp include wood pulp, non-wood pulp, and deinked pulp. Examples of the wood pulp include chemical pulps such as hardwood kraft pulp (LBKP), softwood kraft pulp (NBKP), sulfite pulp (SP), dissolving pulp (DP), soda pulp (AP), unbleached kraft pulp (UKP), and oxygen bleached kraft pulp (OKP). Further, included are, but not particularly limited to, semichemical pulps such as semi-chemical pulp (SCP) and chemi-ground wood pulp (CGP); and mechanical pulps such as ground pulp (GP) and thermomechanical pulp (TMP, BCTMP). Examples of the non-wood pulp include, but not particularly limited to, cotton pulps such as cotton linter and cotton lint; non-wood type pulps such as hemp, wheat straw, and bagasse; and cellulose isolated from ascidian, seaweed, etc., chitin, and chitosan. As a deinked pulp, there is deinked pulp using waste paper as a raw material, but it is not particularly limited thereto. The pulp of the present embodiment may be used singly, or in combination of two or more types. Among the above-listed pulp types, wood pulp and deinked pulp including cellulose are preferable from the viewpoint of easy availability. Among wood pulps, chemical pulp is preferable because it has a higher cellulose content to enhance the yield of ultrafine cellulose fibers and decomposition of cellulose in the pulp is mild at the time of ultrafine fiber formation (defibration) to yield ultrafine cellulose fibers having a long fiber length with a high aspect ratio. Among them, kraft pulp and sulfite pulp are most preferably selected. A fiber layer containing the ultrafine cellulose fibers having a long fiber length with a high aspect ratio tends to exhibit a high strength.

The average fiber width of ultrafine cellulose fibers is 1000 nm or less as observed with an electron microscope. The average fiber width is preferably 2 nm or more and 1000 nm or less, more preferably 2 nm or more and 100 nm or less, even more preferably 2 nm or more and 50 nm or less, and further preferably 2 nm or more and 10 nm or less, but is not particularly limited thereto. When the average fiber width of ultrafine cellulose fibers is less than 2 nm, since they are dissolved in water as cellulose molecules, there appears tendency that the physical properties (strength, rigidity, and dimensional stability) as an ultrafine cellulose fiber are not expressed sufficiently. The ultrafine cellulose fiber is, for example, monofilament cellulose having a fiber width of 1000 nm or less.

The measurement of a fiber width of an ultrafine cellulose fiber by electron microscopic observation is carried out as follows. An aqueous suspension of ultrafine cellulose fibers having a concentration of 0.05% by mass or more and 0.1% by mass or less is prepared, and the suspension is casted onto a hydrophilized carbon film-coated grid as a sample for TEM observation. If the sample contains wide fibers, SEM images of the surface of the suspension casted onto glass may be observed. The sample is observed using electron microscope images taken at a magnification of 1000×, 5000×, 10000×, or 50000× according to the widths of the constituent fibers. However, the sample, the observation conditions, and the magnification are adjusted so as to satisfy the following conditions:

(1) A single straight line X is drawn in any given portion in an observation image, and 20 or more fibers intersect with the straight line X.

(2) A straight line Y, which intersects perpendicularly with the aforementioned straight line in the same image as described above, is drawn, and 20 or more fibers intersect with the straight line Y.

The widths of the fibers intersecting the straight line X and the straight line Y in the observation image meeting the above-described conditions are visually read. 3 or more sets of images of surface portions, which are at least not over-lapped, are thus observed, and the widths of the fibers intersecting the straight line X and the straight line Y are read in the each image. At least 120 fiber widths (20 fibers×2×3=120) are thus read. The average fiber width (which is simply referred to as a "fiber width" at times) of ultrafine cellulose fibers is an average value of the fiber widths thus read.

The fiber length of the ultrafine cellulose fibers is not particularly limited, and it is preferably 0.1 μm or more and 1000 μm or less, more preferably 0.1 μm or more and 800 μm or less, and particularly preferably 0.1 μm or more and 600 μm or less. By setting the fiber length within the above-described range, destruction of the crystalline region of the ultrafine cellulose fibers can be suppressed, and the slurry viscosity of the ultrafine cellulose fibers can also be set within an appropriate range. It is to be noted that the fiber length of the ultrafine cellulose fibers can be obtained by an image analysis using TEM, SEM or AFM.

Ultrafine cellulose fibers preferably have a type I crystal structure. In this regard, the fact that ultrafine cellulose fibers have a type I crystal structure may be identified by a diffraction profile obtained from a wide angle X-ray diffraction photograph using CuKα ($\lambda$=1.5418 Å) monochromatized with graphite. Specifically, it may be identified based on the fact that there are typical peaks at two positions near $2\theta$=14° or more and 17° or less, and near $2\theta$=22° or more and 23° or less.

The percentage of the type I crystal structure occupied in the ultrafine cellulose fibers is preferably 30% or more, more preferably 50% or more, and further preferably 70% or more.

The rate of a crystal portion comprised in ultrafine cellulose fibers is not particularly limited in present invention. It is preferable to use cellulose, in which the crystallinity obtained by an X-ray diffractometry is 60% or more. The crystallinity is preferably 65% or more, and more preferably 70% or more. In this case, more excellent performance can be expected, in terms of heat resistance and the expression of low linear thermal expansion. The crystallinity can be obtained by measuring an X-ray diffraction profile and obtaining it according to a common method (Seagal et al., Textile Research Journal, Vol. 29, p. 786, 1959).

The ultrafine cellulose fibers preferably have a substituent, and the substituent is preferably an anionic group. The anionic group is preferably at least one selected from, for example, a phosphoric acid group or a phosphoric acid group-derived substituent (which is simply referred to as a "phosphoric acid group" at times), a carboxyl group or a carboxyl group-derived substituent (which is simply referred to as a "carboxyl group" at times), and a sulfone group or a sulfone group-derived substituent (which is simply referred to as a "sulfone group" at times); is more preferably at least one selected from a phosphoric acid group and a carboxyl group; and is particularly preferably a phosphoric acid group.

The ultrafine cellulose fibers preferably have phosphoric acid groups or substituents derived from the phosphoric acid group. The phosphoric acid group is a divalent functional group corresponding to a phosphoric acid from which a hydroxyl group is removed. Specifically, it is a group represented by —$PO_3H_2$. The substituents derived from the phosphoric acid group include substituents, such as condensation-polymerized phosphoric acid groups, salts of phosphoric acid groups, and phosphoric acid ester groups, and they may be either ionic substituents or nonionic substituents.

In the present invention, the phosphoric acid group or a substituent derived from the phosphoric acid group may be a substituent represented by Formula (1) below:

[Formula 1]

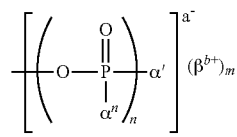

(1)

In Formula (1), a, b, m and n each independently represent an integral number (provided that $a=b\times m$); $\alpha^n$ (n is an integral number from 1 to n) and $\alpha'$ each independently represent R or OR. R is a hydrogen atom, a saturated straight chain hydrocarbon group, a saturated branched chain hydrocarbon group, a saturated cyclic hydrocarbon group, an unsaturated straight chain hydrocarbon group, an unsaturated branched chain hydrocarbon group, an aromatic group, or a derivative group thereof; β is a monovalent or higher valent cation consisting of organic matter or inorganic matter.

<Phosphoric Acid Group Introduction Step>

The phosphoric acid group introduction step may be performed by allowing at least one selected from a compound having phosphoric acid groups and salts thereof (hereinafter, referred to as a "phosphorylating reagent" or "Compound A") to react with the fiber raw material including cellulose. Such a phosphorylating reagent may be mixed into the fiber raw material in a dry or wet state, in the form of a powder or an aqueous solution. In another example, a powder or an aqueous solution of the phosphorylating reagent may be added into a slurry of the fiber raw material.

The phosphoric acid group introduction step may be performed by allowing at least one selected from a compound having phosphoric acid groups and salts thereof (a phosphorylating reagent or Compound A) to react with the fiber raw material including cellulose. It is to be noted that this reaction may be performed in the presence of at least one selected from urea and derivatives thereof (hereinafter, referred to as "Compound B").

One example of the method of allowing Compound A to act on the fiber raw material in the presence of Compound B includes a method of mixing the fiber raw material in a dry or wet state with a powder or an aqueous solution of Compound A and Compound B. Another example thereof includes a method of adding a powder or an aqueous solution of Compound A and Compound B to a slurry of the fiber raw material. Among them, a method of adding an aqueous solution of Compound A and Compound B to the fiber raw material in a dry state, or a method of adding a powder or an aqueous solution of Compound A and Compound B to the fiber raw material in a wet state is preferable because of the high homogeneity of the reaction. Compound A and Compound B may be added at the same time or may be added separately. Alternatively, Compound A and Compound B to be subjected to the reaction may be first added as an aqueous solution, which may be then compressed to squeeze out redundant chemicals. The form of the fiber raw material is preferably a cotton-like or thin sheet form, but the form is not particularly limited thereto.

The Compound A used in the present embodiment is at least one selected from a compound having a phosphoric acid group and a salt thereof.

Examples of the compound having a phosphoric acid group include, but are not particularly limited to, phosphoric acid, lithium salts of phosphoric acid, sodium salts of phosphoric acid, potassium salts of phosphoric acid, and ammonium salts of phosphoric acid. Examples of the lithium salts of phosphoric acid include lithium dihydrogen phosphate, dilithium hydrogen phosphate, trilithium phosphate, lithium pyrophosphate, and lithium polyphosphate. Examples of the sodium salts of phosphoric acid include sodium dihydrogen phosphate, disodium hydrogen phosphate, trisodium phosphate, sodium pyrophosphate, and sodium polyphosphate. Examples of the potassium salts of phosphoric acid include potassium dihydrogen phosphate, dipotassium hydrogen phosphate, tripotassium phosphate, potassium pyrophosphate, and potassium polyphosphate. Examples of the ammonium salts of phosphoric acid include ammonium dihydrogen phosphate, diammonium hydrogen phosphate, triammonium phosphate, ammonium pyrophosphate, and ammonium polyphosphate.

Among them, from the viewpoints of high efficiency in introduction of the phosphoric acid group, an improving tendency of the defibration efficiency in a defibration step described below, low cost, and industrial applicability, phosphoric acid, sodium phosphate, potassium phosphate, and ammonium phosphate are preferable. Sodium dihydrogenphosphate, or disodium hydrogenphosphate is more preferable.

Further, since the uniformity of the reaction is improved and the efficiency in introduction of a phosphoric acid group is enhanced, the Compound A is preferably used as an aqueous solution. Although there is no particular restriction on the pH of an aqueous solution of the Compound A, the pH is preferably pH 7 or less because the efficiency in introduction of a phosphoric acid group is high, and more preferably pH 3 or more and pH 7 or less from the viewpoint of suppression of hydrolysis of a pulp fiber. The pH of an aqueous solution of the Compound A may be adjusted, for example, by using, among compounds having a phosphoric acid group, a combination of an acidic one and an alkaline one, and changing the quantitative ratio thereof. The pH of an aqueous solution of Compound A may also be adjusted by adding an inorganic alkali or an organic alkali to an acidic compound among compounds having a phosphoric acid group.

Although there is no particular restriction on the amount of the Compound A added to a fiber raw material, if the amount of the Compound A added is converted to a phosphorus atomic weight, the amount of phosphorus atoms added with respect to the fiber raw material (absolute dry mass) is preferably 0.5% by mass or more and 100% by mass or less, more preferably 1% by mass or more and 50% by mass or less, and most preferably 2% by mass or more and 30% by mass or less. When the amount of phosphorus atoms added to the fiber raw material is within the above-described range, the yield of ultrafine cellulose fibers can be further improved. When the amount of phosphorus atoms added to the fiber raw material exceeds 100% by mass, the effect of improving the yield levels off, and the cost of the Compound A used increases. On the other hand, by adjusting the amount of phosphorus atoms added to the fiber raw material to the lower limit value or more, the yield can be increased.

Examples of the Compound B used in the present embodiment include urea, biuret, 1-phenyl urea, 1-benzyl urea, 1-methyl urea, and 1-ethyl urea.

The Compound B is preferably used as an aqueous solution, as with the Compound A. Further, an aqueous solution in which both the Compound A and Compound B are dissolved is preferably used, because the uniformity of a reaction may be enhanced. The amount of the Compound B added to a fiber raw material (absolute dry mass) is preferably 1% by mass or more and 500% by mass or less, more preferably 10% by mass or more and 400% by mass or less, further preferably 100% by mass or more and 350% by mass or less, and particularly preferably 150% by mass or more and 300% by mass or less.

The reaction system may contain an amide or an amine, in addition to the compound A and the compound B. Examples of the amide include formamide, dimethylformamide, acetamide, and dimethylacetamide. Examples of the amine include methylamine, ethylamine, trimethylamine, triethylamine, monoethanolamine, diethanolamine, triethanolamine, pyridine, ethylenediamine, and hexamethylenediamine. Among them, particularly, triethylamine is known to work as a favorable reaction catalyst.

In the phosphoric acid group introduction step, it is preferable to perform a heat treatment. For the temperature of such a heat treatment, it is preferable to select a temperature that allows an efficient introduction of phosphoric acid groups while suppressing the thermal decomposition or hydrolysis reaction of fibers. Specifically, the temperature is preferably 50° C. or more and 300° C. or less, more preferably 100° C. or more and 250° C. or less, and further preferably 130° C. or more and 200° C. or less. In addition, a vacuum dryer, an infrared heating device, or a microwave heating device may be used for heating.

Upon the heat treatment, if the time for leaving the fiber raw material to stand still gets longer while the fiber raw material slurry to which the compound A is added contains water, as drying advances, water molecules and the compound A dissolved therein move to the surface of the fiber raw material. As such, there is a possibility of the occurrence of unevenness in the concentration of the compound A in the fiber raw material, and the introduction of phosphoric acid groups to the fiber surface may not progress uniformly. In order to suppress the occurrence of unevenness in the concentration of the compound A in the fiber raw material due to drying, the fiber raw material in the shape of a very thin sheet may be used, or a method of heat-drying or vacuum-drying the fiber raw material, while kneading or stirring with the compound A using a kneader or the like, may be employed.

As a heating device used for heat treatment, a device capable of always discharging moisture retained by slurry or moisture generated by an addition reaction of phosphoric acid groups with hydroxy groups of the fiber to the outside of the device system is preferable, and for example, forced convection ovens or the like are preferable. By always discharging moisture in the device system, in addition to being able to suppress a hydrolysis reaction of phosphoric acid ester bonds, which is a reverse reaction of the phosphoric acid esterification, acid hydrolysis of sugar chains in the fiber may be suppressed as well, and ultrafine fibers with a high axial ratio can be obtained.

The time for heat treatment is, although affected by the heating temperature, preferably 1 second or more and 300 minutes or less, more preferably 1 second or more and 1000 seconds or less, and further preferably 10 seconds or more and 800 seconds or less, after moisture is substantially removed from the fiber raw material slurry. In the present invention, by setting the heating temperature and heating time within an appropriate range, the amount of phosphoric acid groups introduced can be set within a preferred range.

The amount of phosphoric acid groups introduced is, per 1 g (mass) of the ultrafine cellulose fibers, preferably 0.1 mmol/g or more and 3.5 mmol/g or less, more preferably 0.14 mmol/g or more and 2.5 mmol/g or less, even more preferably 0.2 mmol/g or more and 2.0 mmol/g or less, further preferably 0.2 mmol/g or more and 1.8 mmol/g or less, particularly preferably 0.4 mmol/g or more and 1.8 mmol/g or less, and most preferably 0.6 mmol/g or more and 1.8 mmol/g or less. By setting the amount of phosphoric acid groups introduced within the above-described range, it may become easy to perform fibrillation on the fiber raw material ultrafine, and the stability of the ultrafine cellulose fibers can be enhanced. In addition, by setting the amount of phosphoric acid groups introduced within the above-described range, the slurry viscosity of the ultrafine cellulose fibers may be adjusted within an appropriate range.

The amount of phosphoric acid groups introduced into a fiber raw material may be measured by a conductometric titration method. Specifically, the amount introduced may be measured by performing fibrillation on ultrafine fibers in a defibration treatment step, treating the resulting slurry comprising ultrafine cellulose fibers with an ion exchange resin, and then examining a change in the electrical conductivity while adding an aqueous sodium hydroxide solution.

The conductometric titration confers a curve shown in FIG. 3 as an alkali is added. First, the electrical conductivity is rapidly reduced (hereinafter, this region is referred to as a "first region"). Then, the conductivity starts rising slightly (hereinafter, this region is referred to as a "second region"). Then, the increment of the conductivity is increased (hereinafter, this region is referred to as a "third region"). In short, three regions appear. Among them, the amount of the alkali required for the first region among these regions is equal to the amount of a strongly acidic group in the slurry used in the titration, and the amount of the alkali required for the second region is equal to the amount of a weakly acidic group in the slurry used in the titration. When condensation of a phosphoric acid group occurs, the weakly acidic group is apparently lost, so that the amount of the alkali required for the second region is decreased as compared with the amount of the alkali required for the first region. On the other hand, the amount of the strongly acidic group agrees with the amount of the phosphorus atom regardless of the presence or absence of condensation. Therefore, the simple term "the amount of the phosphoric acid group introduced (or the amount of the phosphoric acid group)" or "the amount of the substituent introduced (or the amount of the substituent)" refers to the amount of the strongly acidic group. That is to say, the amount (mmol) of the alkali required for the first region in the curve shown in FIG. 3 is divided by the solid content (g) in the slurry as a titration target to obtain the amount (mmol/g) of the substituent introduced.

The phosphoric acid group introduction step may be performed at least once, but may be repeated multiple times as well. This case is preferable, since more phosphoric acid groups are introduced.

<Alkali Treatment>

When ultrafine cellulose fibers are produced, an alkali treatment may be conducted between a phosphoric acid group introduction step and a defibration treatment step described below. The method of the alkali treatment is not particularly limited, and for example, a method of immersing a phosphoric acid group-introduced fiber in an alkaline solution may be applied.

The alkali compound contained in the alkaline solution is not particularly limited, and it may be an inorganic alkaline compound or an organic alkali compound. The solvent of the alkaline solution may be either water or an organic solvent. The solvent is preferably a polar solvent (water, or a polar organic solvent such as alcohol), and more preferably an aqueous solvent containing at least water.

Among alkaline solutions, a sodium hydroxide aqueous solution, or a potassium hydroxide aqueous solution is particularly preferable, because of high versatility.

The temperature of the alkali solution in the alkali treatment step is not particularly limited, but it is preferably 5° C. or more and 80° C. or less, and more preferably 10° C. or more and 60° C. or less.

The immersion time in the alkali solution in the alkali treatment step is not particularly limited, but it is preferably 5 minutes or more and 30 minutes or less, and more preferably 10 minutes or more and 20 minutes or less.

The amount of the alkali solution used in the alkali treatment is not particularly limited, but it is preferably 100% by mass or more and 100000% by mass or less, and more preferably 1000% by mass and 10000% by mass or less, with respect to the absolute dry mass of the phosphoric acid group-introduced fibers.

In order to reduce the consumption of an alkaline solution in the alkali treatment step, a phosphoric acid group-introduced fiber may be washed with water or an organic solvent before the alkali treatment step. After the alkali treatment, the alkali-treated phosphoric acid group-introduced fiber is preferably washed with water or an organic solvent before the defibration treatment step in order to improve the handling property.

<Defibration Treatment>

The phosphoric acid group-introduced fiber is subjected to a defibration treatment in a defibration treatment step. In the defibration treatment step, a fiber is defibrated usually using a defibration treatment apparatus to yield a slurry comprising ultrafine cellulose fibers, and there is no particular restriction on a treatment apparatus, or a treatment method.

A high-speed defibrator, a grinder (stone mill-type crusher), a high-pressure homogenizer, an ultrahigh-pressure homogenizer, a high-pressure collision-type crusher, a ball mill, a bead mill, or the like can be used as the defibration treatment apparatus. Alternatively, for example, a wet milling apparatus such as a disc-type refiner, a conical refiner, a twin-screw kneader, an oscillation mill, a homomixer under high-speed rotation, an ultrasonic disperser, or a beater may also be used as the defibration treatment apparatus. The defibration treatment apparatus is not limited to the above. Examples of a preferred defibration treatment method include a high-speed defibrator, a high-pressure homogenizer, and an ultrahigh-pressure homogenizer, which are less affected by milling media, and are free from apprehension of contamination.

Upon the defibration treatment, the fiber raw material is preferably diluted with water and an organic solvent each alone or in combination, to prepare a slurry, though the method is not particularly limited thereto. Water as well as a polar organic solvent can be used as a dispersion medium. Preferred examples of the polar organic solvent include, but are not particularly limited to, alcohols, ketones, ethers, dimethyl sulfoxide (DMSO), dimethylformamide (DMF), and dimethylacetamide (DMAc). Examples of the alcohols include methanol, ethanol, n-propanol, isopropanol, n-butanol, and t-butyl alcohol. Examples of the ketones include acetone and methyl ethyl ketone (MEK). Examples of the ethers include diethyl ether and tetrahydrofuran (THF). One of these dispersion media may be used, or two or more thereof may be used. The dispersion medium may also contain a solid content other than the fiber raw material, for example, hydrogen-binding urea.

According to the present invention, a defibration treatment may be performed after ultrafine cellulose fibers are concentrated and dried. In this case, there is no particular restriction on the method of concentration and drying, and examples thereof include a method in which a concentrating agent is added into a slurry comprising ultrafine cellulose fibers, and a method using a dehydrator, a press, a dryer, and the like used generally. Further, publicly known methods, for example as described in WO 2014/024876, WO 2012/107642, and WO 2013/121086, may be used. Also, the concentrated ultrafine cellulose fibers may be formed into a sheet. It is also possible that the sheet may be pulverized and subjected to a defibration treatment.

As a pulverizing device used for pulverizing ultrafine cellulose fibers, a high-speed defibrator, a grinder (stone mill-type grinder), a high-pressure homogenizer, an ultrahigh pressure homogenizer, a high-pressure collision type crusher, a ball mill, a bead mill, a disk type refiner, a conical refiner, a twin screw kneader, a vibrating mill, a device for wet milling, such as a high-speed rotating homomixer, an ultrasonic disperser, and a beater, may be used without limitation thereto.

The material comprising ultrafine cellulose fibers with phosphoric acid groups, which has been obtained by the above-mentioned method, is a slurry comprising ultrafine cellulose fibers, and it may be diluted with water to a desired concentration.

<Optional Components>

The fiber layer may comprise optional components other than ultrafine cellulose fibers. Examples of such optional components include hydrophilic polymers and organic ions. The hydrophilic polymers are preferably hydrophilic, oxygen-containing organic compounds (except for the above-described cellulose fibers). The oxygen-containing organic compound is preferably nonfibrous, and such nonfibrous, oxygen-containing organic compounds do not include ultrafine cellulose fibers or thermoplastic resin fibers.

The oxygen-containing organic compound is preferably a hydrophilic, organic compound. Hydrophilic, oxygen-containing organic compounds may improve the strength, density, chemical resistance and the like of the fiber layer. Preferably, hydrophilic, oxygen-containing organic compounds have a SP value of 9.0 or more. In addition, hydrophilic, oxygen-containing organic compounds are preferably such that 1 g or more of the oxygen-containing organic compound is dissolved in 100 ml of ion exchanged water.

Examples of the oxygen-containing organic compounds include: hydrophilic polymers, such as polyethylene glycol, polyethylene oxide, casein, dextrin, starches, modified starches, polyvinyl alcohol, modified polyvinyl alcohol (such as acetoacetylated polyvinyl alcohol), polyethylene oxide, polyvinyl pyrrolidone, polyvinyl methyl ether, polyacrylates, polyacrylamide, alkyl acrylate ester copolymers, urethane-based copolymers, and cellulose derivatives (such as hydroxyethyl cellulose, carboxyethyl cellulose, and carboxymethyl cellulose); and hydrophilic small molecules, such as glycerin, sorbitol, and ethylene glycol. Among them, from the viewpoint of improving the strength, density, chemical resistance and the like of the fiber layer, oxygen-containing organic compounds are preferably polyethylene glycol, polyethylene oxide, glycerin and sorbitol, more preferably at least one selected from polyethylene glycol and polyethylene oxide, and further preferably polyethylene glycol.

The oxygen-containing organic compound is preferably an organic compound polymer having a molecular weight of 50,000 or more and 8,000,000 or less. The molecular weight of the oxygen-containing organic compound is also preferably 100,000 or more and 5,000,000 or less, but for example, it may also be a small molecule having a molecular weight of less than 1000.

The content of oxygen-containing organic compounds in the fiber layer is preferably 1 part by mass or more and 40 parts by mass or less, more preferably 10 parts by mass or more and 30 parts by mass or less, and further preferably 15 parts by mass or more and 25 parts by mass or less, based on 100 parts by mass of ultrafine cellulose fibers comprised in the fiber layer. By setting the content of the oxygen-containing organic compounds within the above-described range, a laminate having high transparency and strength can be formed.

Examples of the organic ions include tetraalkylammonium ions and tetraalkylphosphonium ions. Examples of the tetraalkylammonium ions include a tetramethylammonium ion, a tetraethylammonium ion, a tetrapropylammonium ion, a tetrabutylammonium ion, a tetrapentylammonium ion, a tetrahexylammonium ion, a tetraheptylammonium ion, a tributylmethylammonium ion, a lauryltrimethylammonium ion, a cetyltrimethylammonium ion, a stearyltrimethylammonium ion, an octyldimethylethylammonium ion, a lauryldimethylethylammonium ion, a didecyldimethylammonium ion, a lauryldimethylbenzylammonium ion, and a tributylbenzylammonium ion. Examples of the tetraalkylphosphonium ions include a tetramethylphosphonium ion, a tetraethylphosphonium ion, a tetrapropylphosphonium ion, a tetrabutylphosphonium ion, and a lauryltrimethylphosphonium ion. In addition, tetrapropylonium ions and tetrabutylonium ions may include tetra-n-propylonium ions and tetra-n-butylonium ions, respectively.

(Method for Producing Laminate)

The present invention relates to a method for producing a laminate, comprising either the following step (a) or (b):

(a) applying a resin composition comprising an adhesion aid, after forming a fiber layer comprising cellulose fibers with a fiber width of 1000 nm or less, or (b) applying an ultrafine cellulose fiber dispersion comprising cellulose fibers with a fiber width of 1000 nm or less, after forming a resin layer comprising an adhesion aid.

In the step (a), the adhesion aid is preferably at least one selected from an isocyanate compound and an organic silicon compound, and is more preferably an isocyanate compound. In addition, in the step (b), the adhesion aid is preferably at least one selected from an isocyanate compound and an organic silicon compound, and is more preferably an organic silicon compound.

The step (a) includes a step of forming a fiber layer comprising ultrafine cellulose fibers (hereinafter also referred to as an "ultrafine cellulose fiber-containing sheet"). The step of producing an ultrafine cellulose fiber-containing sheet includes a step of applying an ultrafine cellulose fiber dispersion (ultrafine cellulose fiber-containing slurry) onto a base material, or a step of papermaking from an ultrafine cellulose fiber dispersion. Among others, the step of producing an ultrafine cellulose fiber-containing sheet preferably includes a step of applying an ultrafine cellulose fiber dispersion onto a base material.

<Coating Step>

The coating step is a step of applying an ultrafine cellulose fiber dispersion onto a base material, drying the dispersion to form an ultrafine cellulose fiber-containing sheet, and detaching the sheet from the base material to obtain a sheet. Use of a coating apparatus and a long base material can continuously produce sheets. The concentration of an ultrafine cellulose fiber dispersion to be applied is not particularly limited, and it is preferably 0.05% by mass or more and 5% by mass or less.

The quality of the base material used in the coating step is not particularly limited. Although a base material having higher wettability to the ultrafine cellulose fiber dispersion is preferable because shrinkage of the sheet or the like upon drying is suppressed, it is preferable to select one from which a sheet formed after drying can be easily detached. Of these, a resin plate or a metal plate is preferable, without particular limitation. Examples of the base material that can be used herein include resin plates such as acrylic plates, polyethylene terephthalate plates, vinyl chloride plates, polystyrene plates, and polyvinylidene chloride plates; metal plates such as aluminum plates, zinc plates, copper plates, and iron plates; plates obtained by the oxidation treatment of surface thereof; and stainless plates and brass plates.

When the ultrafine cellulose fiber dispersion has a low viscosity and spreads on the base material in the coating step, a damming frame may be fixed and used on the base material in order to obtain an ultrafine cellulose fiber-containing sheet having a predetermined thickness and basis weight. The quality of the damming frame is not particularly limited, and it is preferable to select ones from which edges of the sheet adhere after drying can be easily detached. Of these, frames formed from resin plates or metal plates are preferable, without particular limitation. Example thereof that can be used herein include frames formed from resin plates such as acrylic plates, polyethylene terephthalate plates, vinyl chloride plates, polystyrene plates, and polyvinylidene chloride plates; from metal plates such as aluminum plates, zinc plates, copper plates, and iron plates; from plates obtained by the oxidation treatment of surface thereof; and from stainless plates and brass plates.

Examples of a coater for applying the ultrafine cellulose fiber dispersion that can be used herein include bar coaters, roll coaters, gravure coaters, die coaters, curtain coaters, and air doctor coaters. Bar coaters, die coaters, curtain coaters, and spray coaters are preferable because more even thickness can be provided.

The coating temperature is not particularly limited, and it is preferably 20° C. or more and 45° C. or less. When the coating temperature is equal to or higher than the above-described lower limit value, it is possible to easily apply the ultrafine cellulose fiber dispersion. When the coating temperature is equal to or lower than the above-described upper limit value, it is possible to prevent volatilization of the dispersion medium upon coating.

In the coating step, it is preferable to apply the ultrafine cellulose fiber dispersion so as to achieve a finished basis weight of the sheet of 10 g/m$^2$ or more and 100 g/m$^2$ or less. By applying the slurry so as to achieve a basis weight that is within the above-described range, a fiber layer having excellent strength can be obtained.

The step of producing an ultrafine cellulose fiber-containing sheet preferably includes a step of drying the ultrafine cellulose fiber dispersion applied onto the base material. The drying method is not particularly limited, and any of a contactless drying method and a method of drying the sheet while locking the sheet may be used, or these methods may also be used in combination.

The contactless drying method is not particularly limited, and a method for drying by heating with hot air, infrared radiation, far-infrared radiation, or near-infrared radiation (a drying method by heating) or a method for drying in vacuum (a vacuum drying method) can be utilized. Although the drying method by heating and the vacuum drying method may be combined, the drying method by heating is usually utilized. The drying with infrared radiation, far-infrared radiation, or near-infrared radiation can be performed using an infrared apparatus, a far-infrared apparatus, or a near-infrared apparatus without particular limitations. The heating temperature for the drying method by heating is not particularly limited, and it is preferably 20° C. or more and 150° C. or less, and more preferably 25° C. or more and 105° C. or less. At the heating temperature equal to or higher than the above-described lower limit value, the dispersion medium can be rapidly volatilized. At the heating temperature equal to or lower than the above-described upper limit value, cost required for the heating can be reduced, and the thermal discoloration of the ultrafine cellulose fibers can be suppressed.

After the drying, the ultrafine cellulose fiber-containing sheet is detached from the base material. When the base material is a sheet, the ultrafine cellulose fiber-containing sheet and base material may be rolled up while they are laminated, and the ultrafine cellulose fiber-containing sheet may be detached from the base material just before use of the ultrafine cellulose fiber-containing sheet.

<Papermaking Step>

The step of producing an ultrafine cellulose fiber-containing sheet may include a step of papermaking from an ultrafine cellulose fiber dispersion. Examples of a paper machine used in the papermaking step include continuous paper machines such as a Fourdrinier paper machine, a cylinder paper machine, and an inclined paper machine, and a multilayer combination paper machine, which is a combination thereof. Known papermaking such as papermaking by hand may be carried out in the papermaking step.

In the papermaking step, the ultrafine cellulose fiber dispersion is wire-filtered and dehydrated to obtain a sheet in a wet state. The concentration of the ultrafine cellulose fiber dispersion is not particularly limited, and it is preferably 0.05% by mass or more and 5% by mass or less. Upon filtration and dehydration of the ultrafine cellulose fiber dispersion, filter fabric for filtration is not particularly limited. It is important that ultrafine cellulose fibers do not pass through filter fabric and the filtration speed is not excessively slow. Such filter fabric is not particularly limited, and a sheet comprising organic polymers, woven fabric, or porous membrane is preferred. Preferred examples of organic polymers include, but are not particularly limited to, non-cellulose organic polymers such as polyethylene terephthalate, polyethylene, polypropylene, and polytetrafluoroethylene (PTFE). Specific examples thereof include, but are not particularly limited to, a polytetrafluoroethylene porous membrane having a pore size of 0.1 μm or more and 20 μm or less, for example, 1 μm, and woven fabric made of polyethylene terephthalate or polyethylene having a pore size of 0.1 μm or more and 20 μm or less, for example, 1 μm.

A method for producing a sheet from an ultrafine cellulose fiber dispersion is not particularly limited, and an example thereof is the method disclosed in WO 2011/013567 comprising using a production apparatus. This production apparatus comprises a dewatering section for ejecting an ultrafine cellulose fiber dispersion onto the upper surface of an endless belt and then dewatering a dispersion medium contained in the ejected ultrafine cellulose fiber dispersion to form a web and a drying section for drying the web to produce a fiber sheet. The endless belt is provided across from the dewatering section to the drying section, and the web formed in the dewatering section is transferred to the drying section while being placed on the endless belt.

A dehydration method that can be used in the present invention is not particularly limited. An example of the method is a dehydration method conventionally used for paper production. A preferred example is a method comprising performing dehydration using a Fourdrinier, cylinder, tilted wire, or the like and then performing dehydration using a roll press. In addition, a drying method is not particularly limited, and an example thereof is a method used for paper production and for example a method using a cylinder dryer, a yankee dryer, hot air drying, a near-infrared heater, or an infrared heater is preferred.

The above-described step (a) comprises a step of applying a resin composition comprising an adhesion aid, after completion of a step of forming a fiber layer. The resin composition may comprise a resin and an adhesion aid, and may further comprise a solvent. Examples of a coater for applying the resin composition, which can be used herein, include bar coaters, roll coaters, gravure coaters, die coaters, curtain coaters, and air doctor coaters.

After coating, a step of curing the resin is preferably provided. In the curing step, heating is preferably carried out such that the temperature reaches 20° C. or more and 150° C. or less.

The above-described step (b) comprises a step of forming a resin layer comprising an adhesion aid. The step of forming a resin layer comprising an adhesion aid preferably comprises a step of adding a diluted solution of the adhesion aid to the resin layer. In this case, the diluted solution of the adhesion aid preferably comprises an organic silicon compound.

In the step of adding a diluted solution of the adhesion aid to a resin layer, the diluted solution of the adhesion aid may be applied or sprayed onto at least one surface of the resin layer. In the step of adding the diluted solution of the adhesion aid, the resin layer is preferably impregnated with the diluted solution of the adhesion aid. Further, in the present invention, the resin layer is preferably impregnated with an organic silicon compound-containing solution.

When the resin layer is impregnated with such an organic silicon compound-containing solution, the concentration of the organic silicon compound-containing solution is preferably 0.1% by mass or more, and more preferably 0.2% by mass or more. On the other hand, the concentration of the organic silicon compound-containing solution is preferably 20% by mass or less, and more preferably 10% by mass or less. By setting the concentration of the organic silicon compound-containing solution within the above-described range, the adhesion properties between the fiber layer and the resin layer can be more effectively enhanced.

The above-described step (b) comprises a step of applying an ultrafine cellulose fiber dispersion comprising cellulose fibers with a fiber width of 1000 nm or less (ultrafine cellulose fiber-containing slurry), after forming a resin layer comprising an adhesion aid. The fiber layer formed in the above-described step (b) is a coated layer. In this case, the solid concentration of the ultrafine cellulose fiber dispersion is preferably 0.05% by mass or more, and more preferably 0.1% by mass or more. On the other hand, the solid concentration of the ultrafine cellulose fiber dispersion is preferably 10% by mass or less.

The ultrafine cellulose fiber dispersion preferably comprises oxygen-containing organic compounds. The content of oxygen-containing organic compounds in the dispersion is preferably 1 part by mass or more and 40 parts by mass or less, more preferably 10 parts by mass or more and 30 parts by mass or less, and further preferably 15 parts by mass or more and 25 parts by mass or less, based on 100 parts by mass of ultrafine cellulose fibers comprised in the ultrafine cellulose fiber dispersion.

When the ultrafine cellulose fiber dispersion has a low viscosity and thus, unintentionally spreads on the resin layer in the step of applying the ultrafine cellulose fiber dispersion, a damming frame may be fixed and used on the resin layer in order to obtain a fiber layer having a predetermined thickness and basis weight. The quality of the damming frame is not particularly limited, and it is preferable to select ones from which edges of the fiber layer adhere after drying can be easily detached. Of these, frames formed from resin plates or metal plates are preferable, without particular limitation. Example thereof that can be used herein include frames formed from resin plates such as acrylic plates, polyethylene terephthalate plates, vinyl chloride plates, polystyrene plates, and polyvinylidene chloride plates; from metal plates such as aluminum plates, zinc plates, copper metal plates, and iron plates; from plates obtained by the oxidation treatment of surface thereof; and from stainless plates and brass plates.

Examples of a coater for applying the ultrafine cellulose fiber dispersion that can be used herein include bar coaters, roll coaters, gravure coaters, die coaters, curtain coaters, and air doctor coaters. Bar coaters, die coaters, curtain coaters, and spray coaters are preferable because more even thickness can be provided.

The coating temperature is not particularly limited, and it is preferably 20° C. or more and 45° C. or less. When the coating temperature is equal to or higher than the above-described lower limit value, it is possible to easily apply the ultrafine cellulose fiber dispersion. When the coating temperature is equal to or lower than the above-described upper limit value, it is possible to prevent volatilization of the dispersion medium upon coating.

In the coating step, it is preferable to apply the ultrafine cellulose fiber dispersion so as to achieve a finished basis weight of the fiber layer of 10 g/m$^2$ or more and 100 g/m$^2$ or less. By applying the slurry so as to achieve a basis weight that is within the above-described range, a fiber layer having excellent strength can be obtained.

The step of producing a fiber layer preferably includes a step of drying the ultrafine cellulose fiber dispersion applied onto the resin layer. The drying method is not particularly limited, and any of a contactless drying method and a method of drying the sheet while locking the sheet may be used, or these methods may also be used in combination.

The contactless drying method is not particularly limited, and a method for drying by heating with hot air, infrared radiation, far-infrared radiation, or near-infrared radiation (a drying method by heating) or a method for drying in vacuum (a vacuum drying method) can be utilized. Although the drying method by heating and the vacuum drying method may be combined, the drying method by heating is usually utilized. The drying with infrared radiation, far-infrared radiation, or near-infrared radiation can be performed using an infrared apparatus, a far-infrared apparatus, or a near-infrared apparatus without particular limitations. The heating temperature for the drying method by heating is not particularly limited, and it is preferably 20° C. or more and 120° C. or less, and more preferably 25° C. or more and 105° C. or less. At the heating temperature equal to or higher than the above-described lower limit value, the dispersion medium can be rapidly volatilized. At the heating temperature equal to or lower than the above-described upper limit value, cost required for the heating can be reduced, and the thermal discoloration of the ultrafine cellulose fibers can be suppressed.

In the above-described step (b), at least one surface of the resin layer may be surface-treated. Examples of the surface treatment include a corona treatment, a plasma discharge treatment, a UV irradiation treatment, an electron beam irradiation treatment, and a flame treatment.

Moreover, the above-described step (b) may include a step of forming an ultrafine uneven structure. Examples of the step of forming an ultrafine uneven structure include a blasting treatment, an embossing treatment, an etching treatment, a corona treatment, and a plasma discharge treatment.

As a method for producing a laminate, in addition to the aforementioned method, there is exemplified a method comprising placing a resin layer on a fiber layer, and then heat-pressing them. Also, there is exemplified a method comprising placing a fiber layer in a mold for injection molding, and then injecting a heat-melted resin in the mold to bond the resin layer to the fiber layer.

(Laminate Having Another Layer)

The laminate of the present invention may further have an inorganic film (hereinafter, also referred to as an inorganic layer). The inorganic layer may be laminated on the side of the fiber layer or may be laminated on the side of the resin layer. The inorganic layer may be laminated on both sides of the laminate.

Substances constituting the inorganic layer are not particularly limited and examples thereof include aluminum, silicon, magnesium, zinc, tin, nickel, and titanium; oxides, carbides, nitrides, oxycarbides, oxynitrides, and oxycarbonitrides thereof; and mixtures thereof. From the viewpoint that high moisture resistance can be stably maintained, silicon oxide, silicon nitride, silicon oxycarbide, silicon oxynitride, silicon oxycarbonitride, aluminum oxide, aluminum nitride, aluminum oxycarbide, aluminum oxynitride, or mixtures thereof are preferred.

A method for forming an inorganic layer is not particularly limited. In general, methods of forming a thin film are roughly classified into Chemical Vapor Deposition (CVD) and Physical Vapor Deposition (PVD), either of which may be employed. Specific examples of CVD methods include plasma CVD, which utilizes plasma, and Catalyst Chemical Vapor Deposition (Cat-CVD) including catalytically cracking material gas using a heated catalyzer. Specific examples of PVD methods include vacuum deposition, ion plating, and sputtering.

As a method for forming an inorganic layer, Atomic Layer Deposition (ALD) can also be employed. The ALD method is a method for forming a thin film in an atomic layer unit by alternately supplying each of source gases of elements constituting the film to be formed to the surface on which a layer is to be formed. This method, albeit disadvantageous in a slow deposition rate, can more smoothly cover even a surface having a complicated shape than the plasma CVD method and has the advantage that a thin film having fewer defects can be formed. The ALD method also has the advantage that this method can control a film thickness at a nano order and can relatively easily cover a wide surface, for example. The ALD method can be further expected to improve a reaction rate, to achieve a low-temperature process, and to decrease unreacted gas, by using plasma.

The thickness of the inorganic layer is not particularly limited and is preferably 5 nm or larger, more preferably 10 nm or larger, further preferably 20 nm or larger, for exerting stable moisture barrier performance. The thickness of the inorganic layer is preferably 1000 nm or less, more preferably 800 nm or less, further preferably 600 nm or less, from the viewpoint of transparency and flexibility.

The laminate of the present invention may further have a resin layer that does not comprise an adhesion aid (hereinafter also referred to as an "adhesion aid-non-containing resin layer"). Thereby, the strength of the laminate can be more effectively improved. Herein, the adhesion aid is as exemplified above. It is to be noted that the phrase "not comprise an adhesion aid" means, for example, that the content of the adhesion aid is less than 0.1 part by mass based on 100 parts by mass of resin constituting the adhesion aid-non-containing resin layer, and the content of the adhesion aid is preferably less than 0.01 part by mass, and more preferably no adhesion aids comprised.

The adhesion aid-non-containing resin layer is a layer comprising a natural resin or synthetic resin as a main component. As such a natural resin or synthetic resin, the same as those for the adhesion aid-containing resin layer can be adopted. In addition, the adhesion aid-non-containing resin layer may further comprise known components used in the resin film field, such as fillers, pigments, dyes and ultraviolet absorbing agents.

The thickness of the adhesion aid-non-containing resin layer is, for example, preferably 10 µm or more, more preferably 20 µm or more, even more preferably 50 µm or more, further preferably 100 µm or more, and particularly preferably 200 µm or more. On the other hand, the thickness of the adhesion aid-non-containing resin layer is, for example, preferably 15000 µm or less, more preferably 5000 µm or less, and further preferably 500 µm or less. Besides, when a plurality of adhesion aid-non-containing resin layers are established, as described later, the total thickness of all of the adhesion aid-non-containing resin layers is preferably within the above-described range.

The adhesion aid-non-containing resin layer can be established, for example, on one surface of the resin layer comprising an adhesion aid, which is on the surface opposite to the surface on the fiber layer side. Thereby, while improving the interlayer adhesion properties of the entire laminate, the strength of the laminate can be improved. Moreover, in the present embodiment, it is also possible to adopt an aspect in which a resin layer comprising an adhesion aid and a fiber layer are successively laminated, for example, on one surface of the adhesion aid-non-containing resin layer, and at least one of a resin layer comprising an adhesion aid and a fiber layer is further laminated on the other surface of the adhesion aid-non-containing resin layer.

The laminate can have one or two or more adhesion aid-non-containing resin layers. For example, two or more adhesion aid-non-containing resin layers may be established on one surface of the fiber layer. These adhesion aid-non-containing resin layers may be contacted with one another, or may be laminated on one another via another layer. Such another layer is not particularly limited, and examples thereof include a resin layer comprising an adhesion aid, a fiber layer, and an inorganic layer.

FIG. 4 includes cross-sectional views each showing a configuration of the laminate of the present invention, wherein a configuration of a laminate 10 having an adhesion aid-non-containing resin layer(s) 20 is shown. In the example shown in FIG. 4(a), a laminate 10 is configured by laminating a fiber layer 2, a resin layer 6 (a resin layer 6 comprising an adhesion aid), and an adhesion aid-non-containing resin layer 20 in this order. In the example shown in FIG. 4(b), a resin layer 6 and an adhesion aid-non-containing resin layer 20 are successively laminated on each of one surface and the other surface of a fiber layer 2. In the present embodiment, for example, a case where the adhesion aid-non-containing resin layer 20 comprises a polycarbonate resin can be given as an example of preferred aspects.

Moreover, in the present embodiment, for example, it is also possible to adopt the aspect shown in FIG. 4(c). FIG. 4(c) illustrates a case where a resin layer 6 and a fiber layer 2 are successively laminated on each of one surface and the other surface of an adhesion aid-non-containing resin layer 20.

FIG. 5 includes cross-sectional views each showing a configuration of the laminate of the present invention, wherein a configuration of a laminate 10 having an adhesion aid-non-containing resin layer(s) 20 and an adhesion aid-non-containing resin layer(s) 22 is shown.

In the example shown in FIG. 5(a), a laminate 10 is configured by laminating a fiber layer 2, a resin layer 6 comprising an adhesion aid, an adhesion aid-non-containing resin layer 22, and an adhesion aid-non-containing resin layer 20 in this order. In this case, the adhesion aid-non-containing resin layer 22 and the adhesion aid-non-containing resin layer 20 may be constituted with different resin materials from each other, or may also be constituted with the same resin materials. In the present embodiment, for example, a case where the adhesion aid-non-containing resin layer 20 comprises a polycarbonate resin and the adhesion aid-non-containing resin layer 22 comprises at least one of a polycarbonate resin and an acrylic resin can be given as an example of preferred aspects.

In the example shown in FIG. 5(b), a resin layer 6, an adhesion aid-non-containing resin layer 22, and an adhesion aid-non-containing resin layer 20 are successively laminated on each of one surface and the other surface of a fiber layer 2. The configuration of the adhesion aid-non-containing resin layer 20 and the adhesion aid-non-containing resin layer 22 in FIG. 5(b) can be determined to be, for example, the same as that in FIG. 5(a).

FIG. 6 includes cross-sectional views each showing a configuration of the laminate of the present invention, wherein a configuration of a laminate 10 having an adhesion aid-non-containing resin layer(s) 20, an adhesion aid-non-containing resin layer(s) 22, and an adhesion aid-non-containing resin layer(s) 24 is shown.

In the example shown in FIG. 6(a), a laminate 10 is configured by laminating a fiber layer 2, a resin layer 6 comprising an adhesion aid, an adhesion aid-non-containing resin layer 22, an adhesion aid-non-containing resin layer 24, and an adhesion aid-non-containing resin layer 20 in this order. In this case, two or more layers out of the three layers, namely, the adhesion aid-non-containing resin layer 22, the adhesion aid-non-containing resin layer 24, and the adhesion aid-non-containing resin layer 20 may be constituted with different resin materials from one another, or all of the three layers may also be constituted with the same resin materials. In the present embodiment, for example, a case where the adhesion aid-non-containing resin layer 20 comprises a polycarbonate resin, and the adhesion aid-non-containing resin layer 22 and the adhesion aid-non-containing resin layer 24 each comprise at least one of a polycarbonate resin and an acrylic resin, can be given as an example of preferred aspects. In particular, a case where the adhesion aid-noncontaining resin layer 20 comprises a polycarbonate resin, the adhesion aid-non-containing resin layer 24 comprises an acrylic resin, and the adhesion aid-non-containing resin layer 22 comprises a polycarbonate resin, can be given as a preferred aspect.

In the example shown in FIG. 6(b), a resin layer 6, an adhesion aid-non-containing resin layer 22, an adhesion aid-non-containing resin layer 24, and an adhesion aid-non-containing resin layer 20 are successively laminated on each of one surface and the other surface of a fiber layer 2. The configuration of the adhesion aid-non-containing resin layer 20, the adhesion aid-non-containing resin layer 22, and the adhesion aid-non-containing resin layer 24 in FIG. 6(b) can be determined to be, for example, the same as that in FIG. 6(a).

<Intended Use>

In a preferred embodiment, the laminate of the present invention is a transparent laminate having high mechanical strength and small haze. From the viewpoint of utilizing excellent optical properties, the laminate of the present invention is suitable for intended uses such as light transmissive substrates for various display devices, various solar cells, and the like. In addition, the laminate of the present invention is also suitable for intended uses such as substrates of electronic devices, components of consumer electronics, window materials of various types of vehicles or buildings, interior materials, exterior materials, and wrapping materials.

EXAMPLES

Hereinafter, the features of the present invention will be described more specifically with reference to Examples and Comparative Examples. The materials, used amounts, proportions, treatment content, treatment procedures, and the like shown in the following Examples can be appropriately changed to the extent that such changes do not depart from the spirit of the present invention. Therefore, the scope of the present invention should not be construed as being limited by the following specific examples.

Example 1

[Phosphorylation]

As a needle bleached kraft pulp, a pulp manufactured by Oji Paper Co., Ltd. (sheet-like having a solid content of 93% and a basis weight of 208 g/m$^2$, and a Canadian standard freeness (CSF) measured according to JIS P8121 after disintegration of 700 ml) was used. A mixed aqueous solution of ammonium dihydrogenphosphate and urea was impregnated into 100 parts by weight of the needle bleached kraft pulp (absolute dry mass), and the resultant mixture was pressed to be 45 parts by mass of ammonium dihydrogenphosphate and 200 parts by mass of urea to obtain a chemical-impregnated pulp. The obtained chemical-impregnated pulp was dried and heat-treated for 200 seconds in a hot air dryer at 165° C. to introduce a phosphoric acid group into the cellulose in the pulp. The amount of the phosphoric acid group introduced at this time was 0.98 mmol/g.

The amount of the phosphoric acid group introduced was measured by diluting the cellulose with ion-exchanged water to a content of 0.2% by mass, then treating with an ion-exchange resin, and titrating with alkali. In the treatment with the ion exchange resin, 1/10 by volume of a strongly acidic ion exchange resin (Amberjet 1024: conditioning agent, manufactured by Organo Corporation) was added to a slurry containing 0.2% by mass of the cellulose, and the resultant mixture was shaken for 1 hour. Then, the mixture was poured onto a mesh having 90 μm-apertures to separate the resin from the slurry. In the alkali titration, the change in the electric conductivity value indicated by the slurry was measured while adding a 0.1 N aqueous solution of sodium hydroxide to the slurry containing cellulose fibers after the ion exchange. Specifically, the alkali amount (mmol) required in the first region of the curve shown in FIG. 3 was divided by the solid content (g) in the slurry to be titrated, and the obtained value was taken as the amount (mmol/g) of the substituent group introduced.

[Alkali Treatment and Washing]

Next, 5000 ml of ion-exchanged water was added to the cellulose into which the phosphoric acid group had been introduced, and the resultant mixture was stirred and washed, and then dehydration was carried out. The dehydrated pulp was diluted with 5000 ml of ion-exchanged water, and a 1 N aqueous solution of sodium hydroxide was gradually added while stirring until the pH was 12 or more and 13 or less to obtain a pulp dispersion. Then, the pulp dispersion was dehydrated and washed with 5000 ml of ion-exchanged water. This dehydration and washing was repeated one more time.

[Machine Treatment]

Ion-exchanged water was added to the pulp obtained after the washing and dehydration to produce a pulp dispersion having a solid concentration of 1.0% by mass. This pulp dispersion was treated using a high-pressure homogenizer (Niro Soavi "Panda Plus 2000") to obtain a cellulose dispersion. In the treatment using the high-pressure homogenizer, the pulp dispersion was passed through the homogenizing chamber five times at an operating pressure of 1200 bar. Further, the cellulose dispersion was treated using a wet atomization apparatus ("Ultimizer", manufactured by Sugino Machine Limited) to obtain an ultrafine cellulose fiber dispersion (A). In the treatment using the wet atomization apparatus, the cellulose dispersion (A) was passed through the treatment chamber five times at a pressure of 245 MPa. The average fiber width of ultrafine cellulose fibers contained in the ultrafine cellulose fiber dispersion (A) was 4 nm.

[Formation of Fiber Layer]

The ultrafine cellulose fiber dispersion (A) was adjusted so as to have a solid concentration of 0.5% by mass. Then, 20 parts by mass of a 0.5% by mass aqueous solution of polyethylene oxide (PEO-18, manufactured by Sumitomo Seika Chemicals Co., Ltd.) was added to 100 parts by mass of the ultrafine cellulose fiber dispersion (A) to obtain an ultrafine cellulose fiber dispersion (B). Next, the ultrafine cellulose fiber dispersion (B) was weighed so that the finished basis weight of the layer containing cellulose fibers (layer formed from the solid content of the ultrafine cellulose fiber dispersion (B)) was 50 g/m$^2$, applied onto a commercially available acrylic plate, and dried with a thermo-hygrostat at 35° C. and a relative humidity of 15%. A metal frame for damming (metal frame having an inner dimension of 180 mm×180 mm) was arranged on the acrylic plate so as to have a predetermined basis weight. As a result of the above procedure, a fiber layer (layer containing cellulose fibers) was obtained.

[Lamination]

A resin composition was obtained by mixing 15 parts by mass of a special polycarbonate resin with enhanced solvent solubility (Yupizeta 2136, manufactured by MITSUBISHI GAS CHEMICAL COMPANY, INC.), 57 parts by mass of toluene, and 28 parts by mass of methyl ethyl ketone. Subsequently, 2.25 parts by mass of an isocyanurate compound (Duranate TPA-100, manufactured by Asahi Kasei Chemicals Corporation) was added as an adhesion aid to the resin composition. The obtained mixture was applied onto one surface of the fiber layer, using a bar coater, and was then hardened by being heated at 100° C. for 1 hour to form a resin layer. Subsequently, a resin layer was also formed on the opposite surface of the fiber layer by the same procedures as those described above. As a result of the above procedures, a laminate in which a resin layer was laminated on both surfaces of the fiber layer (comprising cellulose fibers) was obtained.

Example 2

A laminate in which a resin layer was laminated on both surfaces of a fiber layer was obtained in the same manner as that of Example 1, with the exception that the amount of an isocyanate compound added to the resin composition was set at 3 parts by mass in Example 1.

Example 3

A laminate in which a resin layer was laminated on both surfaces of a fiber layer was obtained in the same manner as that of Example 1, with the exception that the amount of an isocyanate compound added upon lamination of a resin layer was set at 5.25 parts by mass in Example 1.

Example 4

[Treatment of Resin Layer with Adhesion Aid]
Methacryloxypropyltrimethoxysilane (SILQUEST A-174 SILANE, manufactured by Momentive Performance Materials Japan) that was an organic silicon compound (silane coupling agent) used as an adhesion aid was diluted with ethanol to a concentration of 0.5% by mass, thereby obtaining a diluted solution of the adhesion aid. Subsequently, a polycarbonate film (Panlite PC-2151, manufactured by Teijin Limited; thickness: 300 μm) used as a resin layer was cut into a size of 210 mm×297 mm, and was then immersed in the above-described diluted solution of the adhesion aid. Subsequently, the polycarbonate film was pulled up, and was then hanged in a constant temperature drier by clipping the upper end thereof with a double chip, followed by performing a heat treatment at 100° C. for 15 minutes. Thereafter, a heat treatment was further performed at 120° C. for 3 hours. As a result of the above treatment, a resin layer comprising an adhesion aid was obtained.
[Lamination]
The ultrafine cellulose fiber dispersion (B) obtained in Example 1 was weighed so that the finished basis weight of the fiber layer could be 50 g/m², was then applied onto the surface-treated resin layer, and was then dried with a thermo-hygrostat at 35° C. and a relative humidity of 15%. Here, a metal frame for damming (metal frame having an inner dimension of 180 mm×180 mm) was arranged on the resin layer so as to have a predetermined basis weight. As a result of the above procedures, a laminate in which a resin layer was laminated on one surface of a fiber layer was obtained.

Example 5

A laminate in which a resin layer was laminated on one surface of a fiber layer was obtained in the same manner as that of Example 4, with the exception that methacryloxypropyltrimethoxysilane was diluted with ethanol to a concentration of 5.0% in the treatment of a resin layer with an adhesion aid in Example 4.

Example 6

A laminate in which a resin layer was laminated on one surface of a fiber layer was obtained in the same manner as that of Example 5, with the exception that methacryloxypropyltriethoxysilane (SILQUEST Y-9936 SILANE, manufactured by Momentive Performance Materials Japan) was used instead of methacryloxypropyltrimethoxysilane in the treatment of a resin layer with an adhesion aid in Example 5.

Example 7

A laminate in which a resin layer was laminated on one surface of a fiber layer was obtained in the same manner as that of Example 5, with the exception that 1,3-bis(3-methacryloxypropyl)tetramethyldisiloxane (TSL9706, manufactured by Momentive Performance Materials Japan) was used instead of methacryloxypropyltrimethoxysilane in the treatment of a resin layer with an adhesion aid in Example 5.

Comparative Example 1

In Example 1, an isocyanate compound was not added as an adhesion aid. Except for this, the same procedures as those in Example 1 were carried out to obtain a laminate in which a resin layer was laminated on both surfaces of a fiber layer.

Comparative Example 2

In Example 4, a resin layer was not treated with an adhesion aid. Except for this, the same procedures as those in Example 1 were carried out to obtain a laminate in which a resin layer was laminated on one surface of a fiber layer.
<Measurement>
The laminates obtained in the Examples and Comparative Examples were evaluated according to the following methods.
[Thickness of Laminate]
The thickness of the laminate was measured using a stylus thickness gauge (Millitron 1202 D, manufactured by Mahr).
[Thickness of Fiber Layer (Layer Containing Cellulose Fibers)]
In Examples 1 to 3 and Comparative Example 1, before lamination, the thickness of the fiber layer was measured with a stylus thickness gauge (manufactured by Mahr, Millitron 1202 D), and the measured value was taken as the thickness of the fiber layer in the laminate. In Examples 4 to 7 and Comparative Example 2, the thickness of the fiber layer in the laminate was calculated by reducing the thickness of the resin layer measured by the below-mentioned method from the thickness of the laminate.
[Thickness of Resin Layer]
In Examples 1 to 3 and Comparative Example 1, the thickness of the resin layer in the laminate was calculated by reducing the thickness of the fiber layer measured by the aforementioned method from the thickness of the laminate. In Examples 4 to 7 and Comparative Example 2, the thickness of the surface-treated resin layer before lamination was measured using a stylus thickness gauge (Millitron 1202 D, manufactured by Mahr), and the measured value was then taken as the thickness of the resin layer in the laminate.

[Density of Fiber Layer (Layer Containing Cellulose Fibers)]

The density of the fiber layer was obtained by dividing the basis weight (50 g/m$^2$) of the fiber layer by the thickness of the fiber layer.

<Evaluation>

The laminates obtained in the Examples and Comparative Examples were evaluated by the following methods.

[Adhesion Properties Between the Fiber Layer and the Resin Layer]

In accordance with JIS K 5400, 100 cross cuts with a size of 1 mm$^2$ were made on the resin layer in the laminates of Examples 1 to 3 and Comparative Example 1, whereas 100 cross cuts with a size of 1 mm$^2$ were made on the fiber layer in the laminates of Examples 4 to 7 and Comparative Example 2. Subsequently, cellophane tape (manufactured by Nichiban Co., Ltd.) was stuck thereto, a load of 1.5 kg/cm$^2$ was then pressed thereon, and the tape was then peeled off in a 90° direction. The adhesion properties between the fiber layer and the resin layer were evaluated based on the number of peeled squares.

[Total Light Transmittance of Laminate]

The total light transmittance of the laminate was evaluated in accordance with JIS K 7361 by using a haze meter ("HM-150", manufactured by Murakami Color Research Laboratory Co., Ltd.).

[Haze of Laminate]

The haze of the laminate was evaluated in accordance with JIS K 7136 by using a haze meter ("HM-150", manufactured by Murakami Color Research Laboratory Co., Ltd.).

As is clear from Table 1, in Examples in which an adhesion aid was added to a resin layer or a resin layer was treated with an adhesion aid, a laminate having good adhesion properties between the fiber layer and the resin layer while maintaining transparency was obtained. In contrast, in Comparative Examples in which an adhesion aid was not added to a resin layer or a resin layer was not treated with an adhesion aid, although transparency was maintained, the adhesion properties between the fiber layer and the resin layer were poor, and thus, problems in practical use may arise.

Example 8 (Production Example 1 of Multilayer Laminate)

A multilayer laminate in which a resin layer is laminated on both sides of a fiber layer can be obtained by the following procedures, using a laminate obtained in any of Examples 4 to 7.

Two laminates obtained in any of Examples 4 to 7 are prepared, and water is applied onto the fiber layer of each laminate with a bar coater. Subsequently, the fiber layer surfaces of the two laminates are adhered together, and then pressed together by applying a rubber roller from the resin layer side of one of the laminates. Further, the adhered laminates are dried at 100° C. for 1 hour in a constant temperature drier to obtain a multilayer laminate in which a resin layer is laminated on both sides of a fiber layer.

TABLE 1

|  |  |  | Ex. 1 | Ex. 2 | Ex. 3 | Ex. 4 | Ex. 5 | Ex. 6 | Ex. 7 | Comp. Ex. 1 | Comp. Ex. 2 |
|---|---|---|---|---|---|---|---|---|---|---|---|
| Fiber layer | Ultrafine cellulose fiber | [part by mass] | 100 | 100 | 100 | 100 | 100 | 100 | 100 | 100 | 100 |
|  | Polyethylene oxide | [part by mass] | 20 | 20 | 20 | 20 | 20 | 20 | 20 | 20 | 20 |
| Resin layer |  | [—] | PC | PC | PC | PC | PC | PC | PC | PC | PC |
| Type of adhesion aid |  | [—] | Isocyanate compound | Isocyanate compound | Isocyanate compound | Organic silicon compound (methacryloxy propyl-trimethoxy silane) | Organic silicon compound (methacryloxy propyl-trimethoxy silane) | Organic silicon compound (methacryloxy propyl-triethoxy silane) | Organic silicon compound (1,3-bis(3-methacryloxy propyl) tetramethyl disiloxane) | — | — |
| Content of adhesion aid (in 100 parts by mass of resin) |  | [part by mass] | 15.0 | 20.0 | 35.0 | 0.6 | 1.6 | 1.6 | 1.4 | — | — |
| Content of isocyanate groups in resin layer |  | [mmol/g] | 0.83 | 1.10 | 1.65 | — | — | — | — | — | — |
| Laminate thickness |  | [µm] | 54.3 | 54.2 | 54.1 | 332.9 | 333.3 | 333.1 | 333.1 | 53.9 | 333.0 |
| Resin layer thickness |  | [µm] | 10.3 (one) 10.5 (the other) | 10.2 (one) 10.5 (the other) | 10.1 (one) 10.5 (the other) | 300 | 300 | 300 | 300 | 10.1 (one) 10.3 (the other) | 300 |
| Fiber layer thickness |  | [µm] | 33.5 | 33.4 | 33.4 | 32.9 | 33.3 | 33.1 | 33.1 | 33.5 | 33.0 |
| Fiber layer density |  | [g/cm$^3$] | 1.49 | 1.5 | 1.5 | 1.52 | 1.5 | 1.51 | 1.51 | 1.49 | 1.52 |
| Adhesion properties between fiber layer and resin layer (number of peeled squares) |  | [—] | 30/100 | 0/100 | 50/100 | 0/100 | 0/100 | 0/100 | 0/100 | 100/100 | 100/100 |
| Total light transmittance of laminate |  | [%] | 91.3 | 91.3 | 91.2 | 89.0 | 89.0 | 89.1 | 89.1 | 91.3 | 89.0 |
| Haze of laminate |  | [%] | 0.8 | 0.5 | 0.8 | 2.5 | 2.7 | 2.4 | 2.8 | 0.8 | 2.5 |

Example 9 (Production Example 2 of Multilayer Laminate)

A multilayer laminate in which a resin layer is laminated on both sides of a fiber layer can be obtained by the following procedures, using a laminate obtained in any of Examples 4 to 7.

Two laminates obtained in any of Examples 4 to 7 are prepared, and a UV-curable acrylic adhesive (Z-587, manufactured by Aica Kogyo Co., Ltd.) is applied onto the fiber layer of each laminate with a bar coater. Subsequently, the fiber layer surfaces of the two laminates are adhered together, and then pressed together by applying a rubber roller from the resin layer side of one of the laminates. Further, 500 mJ/cm$^2$ of UV rays are radiated from the resin layer side of the adhered laminates three times using a UV conveyor (ECS-4011 GX, manufactured by Eye Graphics Co., Ltd.) to cure the UV-curable acrylic adhesive, thereby obtaining a multilayer laminate in which a resin layer is laminated on both sides of a fiber layer.

Example 10 (Production Example 3 of Multilayer Laminate)

A multilayer laminate in which a resin layer is laminated on both sides of a fiber layer can be obtained by the following procedures, using a laminate obtained in any of Examples 4 to 7.

First, a resin composition is obtained by mixing 100 parts by mass of an acrylic resin graft-polymerized with an acryloyl group (Acrit 8KX-012C, manufactured by Taisei Fine Chemical Co., Ltd.) and 38 parts by mass of a polyisocyanate compound (TPA-100, manufactured by Asahi Kasei Chemicals Corporation). Subsequently, the above resin composition is applied onto the cellulose fiber-containing layer of a laminate with a bar coater. Further, heating is carried out at 100° C. for 1 hour for curing, thereby obtaining a multilayer laminate in which a resin layer is laminated on both sides of a fiber layer.

Example 11 (Production Example 1 of Inorganic Film Laminate)

An aluminum oxide film is formed on a laminate obtained in any of Examples 1 to 7 or a multilayer laminate obtained in any of Examples 8 to 10, using an atomic layer deposition apparatus (SUNALE R-100B, manufactured by Picosun). Trimethylaluminum (TMA) is used as the aluminum raw material, and H$_2$O is used for the oxidation of the TMA. The chamber temperature is set at 150° C., the TMA pulse time is set at 0.1 second, and the purge time is set at 4 seconds. Also, the H$_2$O pulse time is set at 0.1 second, and the purge time is set at 4 seconds. An inorganic film laminate in which an aluminum oxide film having a thickness of 30 nm is laminated on both surfaces of the laminate can be obtained by repeating this cycle 405 times.

Example 12 (Production Example 2 of Inorganic Film Laminate)

A silicon oxynitride film is formed on a laminate obtained in any of Examples 1 to 6 or a multilayer laminate obtained in any of Examples 7 to 9, using a plasma CVD apparatus (ICP-CVD roll-to-roll apparatus, manufactured by Selvac Corporation). Specifically, the laminate or multilayer laminate is adhered to the upper surface of a carrier film (PET film) with a double-sided tape, and is then placed in a vacuum chamber. The temperature inside the vacuum chamber is set at 50° C., and the inflow gases are silane, ammonia, oxygen, and nitrogen. Film formation is carried out for 45 minutes by generating a plasma discharge to obtain an inorganic film laminate in which a silicon oxynitride film having a thickness of 500 nm is laminated on one surface of the laminate. Further, an inorganic film laminate in which a silicon oxynitride film having a thickness of 500 nm is laminated on both surfaces of the laminate can also be obtained by performing film formation on the opposite surface in the same manner as described above.

REFERENCE SIGNS LIST

2 FIBER LAYER
6 RESIN LAYER
10 LAMINATE
20 ADHESION AID-NON-CONTAINING RESIN LAYER
22 ADHESION AID-NON-CONTAINING RESIN LAYER
24 ADHESION AID-NON-CONTAINING RESIN LAYER

The invention claimed is:

1. A laminate having
    at least one fiber layer comprising cellulose fibers with a fiber width of 1000 nm or less, and
    at least one resin layer that is contacted with one surface of the fiber layer, wherein
    the resin layer has a polycarbonate resin and an adhesion aid.

2. The laminate according to claim 1, wherein the resin layer further has an acrylic resin.

3. The laminate according to claim 1, wherein the adhesion aid is at least one selected from an isocyanate compound and an organic silicon compound.

4. The laminate according to claim 1, wherein the adhesion aid is concentrated in a region of the resin layer, which is closer to the fiber layer.

5. The laminate according to claim 1, wherein the adhesion aid is an isocyanate compound, and the content of the isocyanate compound is 10 parts by mass or more and 40 parts by mass or less, based on 100 parts by mass of resin comprised in the resin layer.

6. The laminate according to claim 1, wherein the adhesion aid is an isocyanate compound, and the content of isocyanate groups in the resin layer is 0.5 mmol/g or more and 3.0 mmol/g or less.

7. The laminate according to claim 1, wherein the density of the fiber layer is 1.0 g/cm$^3$ or more.

8. A method for producing the laminate according to claim 1, comprising
    (a) applying a resin composition comprising a polycarbonate resin and an adhesion aid, after forming a fiber layer comprising cellulose fibers with a fiber width of 1000 nm or less, or
    (b) applying an ultrafine cellulose fiber dispersion comprising cellulose fibers with a fiber width of 1000 nm or less, after forming a resin layer comprising a polycarbonate resin and an adhesion aid.

9. The method for producing a laminate according to claim 8, comprising (a), wherein the adhesion aid is an isocyanate compound.

10. The method for producing a laminate according to claim 8, comprising (b), wherein the adhesion aid is an organic silicon compound.

11. A laminate having
    at least one fiber layer comprising cellulose fibers with a fiber width of 1000 nm or less, and at least one resin layer that is contacted with one surface of the fiber layer, wherein the resin layer has an adhesion aid, and the cellulose fibers include phosphoric acid groups or substituents derived from phosphoric acid groups.

12. The laminate according to claim 11, wherein the resin layer has at least one selected from a polycarbonate resin and an acrylic resin.

13. The laminate according to claim 11, wherein the resin layer has a polycarbonate resin.

14. The laminate according to claim 11, wherein the adhesion aid is at least one selected from an isocyanate compound and an organic silicon compound.

15. The laminate according to claim 11, wherein the adhesion aid is concentrated in a region of the resin layer, which is closer to the fiber layer.

16. The laminate according to claim 11, wherein the adhesion aid is an isocyanate compound, and the content of the isocyanate compound is 10 parts by mass or more and 40 parts by mass or less, based on 100 parts by mass of resin comprised in the resin layer.

17. The laminate according to claim 11, wherein the adhesion aid is an isocyanate compound, and the content of isocyanate groups in the resin layer is 0.5 mmol/g or more and 3.0 mmol/g or less.

18. The laminate according to claim 11, wherein the density of the fiber layer is 1.0 g/cm$^3$ or more.

19. A method for producing the laminate according to claim 11, comprising
  (a) applying a resin composition comprising an adhesion aid, after forming a fiber layer comprising cellulose fibers with a fiber width of 1000 nm or less, or
  (b) applying an ultrafine cellulose fiber dispersion comprising cellulose fibers with a fiber width of 1000 nm or less, after forming a resin layer comprising an adhesion aid.

* * * * *